US011544170B2

(12) United States Patent
Ramage

(10) Patent No.: US 11,544,170 B2
(45) Date of Patent: Jan. 3, 2023

(54) TOOL FOR INTERROGATING HETEROGENEOUS COMPUTING SYSTEMS

(71) Applicant: Oracle International Corporation, Redwood Shores, CA (US)

(72) Inventor: Stuart Ramage, Tasmania (AU)

(73) Assignee: Oracle International Corporation, Redwood Shores, CA (US)

( * ) Notice: Subject to any disclaimer, the term of this patent is extended or adjusted under 35 U.S.C. 154(b) by 689 days.

(21) Appl. No.: 16/513,092

(22) Filed: Jul. 16, 2019

(65) Prior Publication Data

US 2021/0019246 A1 Jan. 21, 2021

(51) Int. Cl.
*G06F 16/2455* (2019.01)
*G06F 16/242* (2019.01)
*G06F 16/27* (2019.01)
*G06F 11/30* (2006.01)
*G06F 11/34* (2006.01)
*G06F 3/0482* (2013.01)

(52) U.S. Cl.
CPC ........ *G06F 11/3086* (2013.01); *G06F 3/0482* (2013.01); *G06F 11/302* (2013.01); *G06F 11/3409* (2013.01); *G06F 16/2448* (2019.01); *G06F 16/24552* (2019.01); *G06F 16/27* (2019.01)

(58) Field of Classification Search
CPC .. G06F 11/3086; G06F 16/2448; G06F 16/27; G06F 16/24552; G06F 3/0482; G06F 11/302; G06F 11/3409
See application file for complete search history.

(56) References Cited

U.S. PATENT DOCUMENTS

| | | | |
|---|---|---|---|
| 10,873,604 B1* | 12/2020 | Aloisio | H04L 41/28 |
| 2009/0287643 A1* | 11/2009 | Corville | G06F 8/20 |
| 2017/0017562 A1* | 1/2017 | Gulkis | G06F 11/3612 |
| 2017/0017576 A1* | 1/2017 | Cammarota | H04L 41/0896 |
| | | | 709/224 |

OTHER PUBLICATIONS

Unknown, "Oracle Utilities Application Framework Software Development Kit", Developers's Guide, Release 4.4.0.0.0, E63799-05, Dec. 2018.

* cited by examiner

*Primary Examiner* — Irete F Ehichioya
*Assistant Examiner* — Ken Hoang
(74) *Attorney, Agent, or Firm* — Potomac Law Group, PLLC

(57) ABSTRACT

Embodiments implement a tool for interrogating heterogeneous computing systems. Environment variables of a computing device including at least an operating system can be detected. Script commands configured using the retrieved environment variables can be built, where the built script commands are customized based on the detected operating system. Structured query level commands configured to retrieve metadata about enterprise elements associated with the computing device can be built. The SQL commands and script commands can be sequentially executed on the computing device, where the execution of the SQL commands and script commands is customized to the computing device such that device specific database execution parameters and application execution parameters are returned. A structured language document organized according to the returned database execution parameters and application execution parameters can be generated.

18 Claims, 29 Drawing Sheets

| Feature Name | Version | Currently Used | First Used | Last Used |
|---|---|---|---|---|
| Adaptive Plans | 12.1.0.2.0 | TRUE | 2018-10-29 | 2018-10-29 |
| Automatic Maintenance - Optimizer Statistics Gathering | 12.1.0.2.0 | TRUE | 2018-10-29 | 2018-10-29 |
| Automatic Maintenance - SQL Tuning Advisor | 12.1.0.2.0 | TRUE | 2018-10-29 | 2018-10-29 |
| Automatic Maintenance - Space Advisor | 12.1.0.2.0 | TRUE | 2018-10-29 | 2018-10-29 |
| Automatic Reoptimization | 12.1.0.2.0 | TRUE | 2018-10-29 | 2018-10-29 |
| Automatic SGA Tuning | 12.1.0.2.0 | TRUE | 2018-10-29 | 2018-10-29 |
| Automatic SQL Execution Memory | 12.1.0.2.0 | TRUE | 2018-10-29 | 2018-10-29 |
| Automatic Segment Space Management (system) | 12.1.0.2.0 | TRUE | 2018-10-29 | 2018-10-29 |
| Automatic Segment Space Management (user) | 12.1.0.2.0 | TRUE | 2018-10-29 | 2018-10-29 |
| Automatic Undo Management | 12.1.0.2.0 | TRUE | 2018-10-29 | 2018-10-29 |
| Character Set | 12.1.0.2.0 | TRUE | 2018-10-29 | 2018-10-29 |
| Deferred Segment Creation | 12.1.0.2.0 | TRUE | 2018-10-29 | 2018-10-29 |
| Index Organized Tables | 12.1.0.2.0 | TRUE | 2018-10-29 | 2018-10-29 |
| Job Scheduler | 12.1.0.2.0 | TRUE | 2018-10-29 | 2018-10-29 |
| LOB | 12.1.0.2.0 | TRUE | 2018-10-29 | 2018-10-29 |
| Locally Managed Tablespaces (system) | 12.1.0.2.0 | TRUE | 2018-10-29 | 2018-10-29 |
| Locally Managed Tablespaces (user) | 12.1.0.2.0 | TRUE | 2018-10-29 | 2018-10-29 |
| Logfile Multiplexing | 12.1.0.2.0 | TRUE | 2018-10-29 | 2018-10-29 |
| Materialized Views (user) | 12.1.0.2.0 | TRUE | 2018-10-29 | 2018-10-29 |
| Object | 12.1.0.2.0 | TRUE | 2018-10-29 | 2018-10-29 |
| Oracle Java Virtual Machine (system) | 12.1.0.2.0 | TRUE | 2018-10-29 | 2018-10-29 |
| Oracle Managed Files | 12.1.0.2.0 | TRUE | 2018-10-29 | 2018-10-29 |
| Partitioning (system) | 12.1.0.2.0 | TRUE | 2018-10-29 | 2018-10-29 |
| Real-Time SQL Monitoring | 12.1.0.2.0 | TRUE | 2018-10-29 | 2018-10-29 |
| Recovery Area | 12.1.0.2.0 | TRUE | 2018-10-29 | 2018-10-29 |
| Result Cache | 12.1.0.2.0 | TRUE | 2018-10-29 | 2018-10-29 |
| SQL Plan Directive | 12.1.0.2.0 | TRUE | 2018-10-29 | 2018-10-29 |
| SecureFile Compression (user) | 12.1.0.2.0 | TRUE | 2018-10-29 | 2018-10-29 |
| SecureFiles (system) | 12.1.0.2.0 | TRUE | 2018-10-29 | 2018-10-29 |
| SecureFiles (user) | 12.1.0.2.0 | TRUE | 2018-10-29 | 2018-10-29 |
| Server Parameter File | 12.1.0.2.0 | TRUE | 2018-10-29 | 2018-10-29 |
| Traditional Audit | 12.1.0.2.0 | TRUE | 2018-10-29 | 2018-10-29 |
| Unified Audit | 12.1.0.2.0 | TRUE | 2018-10-29 | 2018-10-29 |

33 rows selected.

Batch Codes Not Run in Last 200 Days

| BATCH_CD | Program |
|---|---|
| ACTVTAPY | CIPRAAPB |
| ADM | CIPLADMB |
| ADM2 | CIPLDM2B |
| ANLYZSAR | CIPCCSSB |
| APAYACH | CIPPXAPB |
| APAYCRET | CIPPACRB |
| APAYDSFR | CIPPADPB |
| APOL | CIPADAPB |
| AR-CRCHR | CIPYCRCB |
| AR-DCDT | CIPYPARB |
| AR-DCDTF | CIPYCARB |
| AR-PRFX | CIPYRPAB |
| ASSGNSBN | CIPBASBB |
| BALAPY | CIPRBAPB |
| BCASSIGN | CIPFBCAB |
| BCGNEN | CIPFBCGB |
| BCGSNAP | CIPFBCSB |
| BCU1 | com.splwg.ccb.domain.customerinfo.batch.BillableChargeUploadPreparation |
| BCU2 | com.splwg.ccb.domain.customerinfo.batch.BillableChargeUploadProcess |
| BCUP-PRG | CIPCDBRB |
| BILLING | CIPBBILB |
| BSBRON | CIPBRBBB |
| BSBTRUP | CIPGTUPB |
| CI-ACAMT | com.splwg.ccb.domain.billing.batch.AuditCalcAmountUpgradeProcess |

| TD_TYPE_CD | Entity | CURR_MINUS_11_CREATE | CURR_MINUS_11_CMPLT |
|---|---|---|---|
| BILLING | Create Bill Using Bill Cycle Errors | 141 | 13 |
| BUDMON | Monitor Budgets Errors | 1 | 0 |
| C1-ADAPP | Adjustments Requiring Approval | 4 | 4 |
| C1-CORRD | Corrected Read Notification | 2 | 2 |
| C1-CPAPP | Rebate Claims Requiring Approval | 10 | 10 |
| C1-CSEXC | Case Transition Exception | 3 | 1 |
| C1-CSSRQ | UNSUPPORTED - DO NOT USE | 1 | 1 |
| C1-PPBID | Prepay Biller Task Errors | 2 | 2 |
| C1-TSKTD | Self-Service Task Errors | 18 | 18 |
| C1_HELP | Help Ticket | 115 | 71 |
| C1_MLPDD | Miscellaneous Task (some data propagation) | 60 | 41 |
| C1_IHB | Investigate High Bill Complaint | 815 | 815 |
| C1_NHB | New High Bill Complaint | 5033 | 1818 |
| C1_PI | Product Inquiry | 584 | 584 |

302M — 10 Week To Do Type Analysis

Fig. 3M

| Table | Cached_Flg | CACHE_MODE |
|---|---|---|
| C1_CALC_GRP | BTCH | Cached for Batch |
| C1_CALC_GRP_CHAR | BTCH | Cached for Batch |
| C1_CALC_GRP_L | BTCH | Cached for Batch |
| C1_CALC_RULE | BTCH | Cached for Batch |
| C1_CALC_RULE_CHAR | BTCH | Cached for Batch |
| C1_CALC_RULE_CRT | BTCH | Cached for Batch |
| C1_CALC_RULE_CRT_CHAR | BTCH | Cached for Batch |
| C1_CALC_RULE_CRT_L | BTCH | Cached for Batch |
| C1_CALC_RULE_L | BTCH | Cached for Batch |
| C1_CALC_RULE_MBR_CAT | BTCH | Cached for Batch |
| C1_CALC_RULE_TRGT_CAT | BTCH | Cached for Batch |
| C1_CL_CAT_TYPE | BTCH | Cached for Batch |
| C1_CL_CAT_TYPE_CHAR | BTCH | Cached for Batch |
| C1_CL_CAT_TYPE_L | BTCH | Cached for Batch |
| C1_CL_CAT_VAL | BTCH | Cached for Batch |
| C1_CL_CAT_VAL_L | BTCH | Cached for Batch |
| C1_ISS_CTR | BTCH | Cached for Batch |
| C1_ISS_CTR_CHAR | BTCH | Cached for Batch |

302N — Cached Tables

TOOL FOR INTERROGATING HETEROGENEOUS COMPUTING SYSTEMS

FIELD

The embodiments of the present disclosure generally relate to a tool for interrogating heterogeneous computing systems.

BACKGROUND

Modern enterprise computing implementations have grown into complex systems that include layers of different applications, databases, and other software systems. In addition, customizations are often implemented on top of frameworks to accomplish enterprise specific functionality. As a result, the computing devices that implement enterprise systems can include multiple layers of complexity within heterogenous environments. This can present unique challenges when maintenance, upgrade, or troubleshooting processes are performed. A tool that is capable of interrogating the various computing devices that implement an enterprise system can provide tangible benefits for the enterprise.

SUMMARY

The embodiments of the present disclosure are generally directed to systems and methods for interrogating heterogeneous computing systems using a tool that substantially improve upon the related art. Environment variables of a computing device can be detected, the environment variables including at least an operating system for the computing device. Script commands configured using one or more of the retrieved environment variables can be built, where the built script commands are customized based on the detected operating system. Structured query level commands configured to retrieve metadata about enterprise elements associated with the computing device can be built. The SQL commands and script commands can be sequentially executed on the computing device, where the execution of the SQL commands and script commands is customized to the computing device such that device specific database execution parameters and application execution parameters are returned. A structured language document organized according to the returned database execution parameters and application execution parameters can be generated.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIGS. 7A-7E illustrate sample user interfaces for an enterprise framework according to an example embodiment.

DETAILED DESCRIPTION

Figure 1:
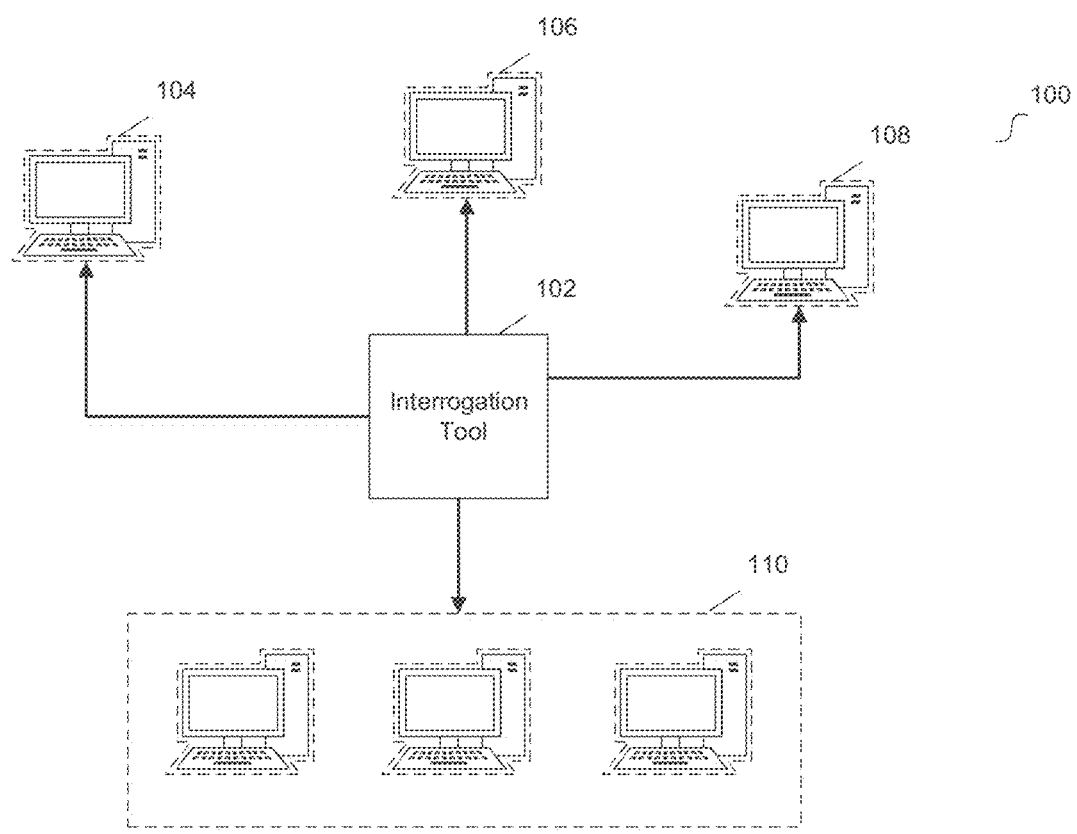
FIG. 1 illustrates a system for interrogating heterogenous computing systems using a tool according to an example embodiment.

Embodiments interrogate heterogenous computing systems using a tool. In some embodiments, an enterprise system can be implemented by a number of different computing systems, each with its own configuration. For example, a first computing device (or cluster of computing devices) may run a first operating system ("OS"), implement a database with a number of tables, include a mix of applications and customizations, run a first schedule of batch processes, and include any other suitable set of configurations for an enterprise system. A second computing device (or cluster of computing devices) may not implement a database, may run a second operating system ("OS"), include a different mix of applications and customizations, run a second schedule of batch processes, and include any other suitable set of configurations for an enterprise system.

Embodiments interrogate these computing devices with a robust tool that is configured to return computing device specific information, such as database execution parameters, application execution parameters, and the like. For example, the robust tool can detect environmental conditions for each of the computing devices. The tool can then build structured query language ("SQL") commands and script commands (e.g., OS specific script commands) designed to interrogate a computing device.

Embodiments can then execute the built SQL commands and script commands. For example, the SQL commands and script commands can achieve a computing device specific custom level of execution and return execution information about how the computing device implements various enterprise elements.

In some embodiments, information returned from the executed SQL and script commands can include a number of database tables, rows for each table, and a cache status for database tables. In another example, the returned information can include the batch processes that have been executed within a period of time on the computing device. In yet another example, the returned information can include database lookups that have been run on the computing device with a number of values above a threshold. In yet another example, the returned information can include patches, fixes, and/or updates installed on the computing device.

In some embodiments, the tool can execute based on an enterprise framework that is implemented on the computing devices. For example, the enterprise framework can include software and workflows for layering enterprise functionality onto heterogeneous computing devices. In some embodiments, the framework can include user interface components, data management components, and other related functionality for implementing and storing configuration information/metadata about a computing environment. For example, a user can navigate user interfaces and input corresponding information to generate an enterprise database table (e.g., in the context of an enterprise system).

Metadata for the database table can then be stored by the framework, for example according to a storage policy. Embodiments of the interrogation tool can generate a query command (e.g., SQL query) for querying this stored metadata. Depending on how the framework and user have populated the metadata for database tables, the executed SQL will return information pertinent to the computing device being interrogated.

In this example, the pertinent information can include a total number of database tables, a cache status, row information, attribute information, foreign key information, and the like. For instance, when creating the database table using the framework elements, the user may input certain aspects of metadata and may not input other aspects (e.g., may leave non-mandatory fields within the user interface blank or certain fields may not apply to some data tables). According, the metadata will not be populated for fields that have been left blank or that do not apply. Embodiments of the interrogation tool build SQL statements based on the metadata model for enterprise elements.

In another example, a user can navigate user interfaces and input corresponding information to generate a batch script (e.g., in the context of an enterprise system). Similarly, metadata for the batch script can then be stored by the framework, for example according to a storage convention. Embodiments of the interrogation tool can then generate a query command (e.g., SQL query) for querying this stored metadata. Depending on how the framework and user have populated the metadata for batch scripts, the executed SQL will return information pertinent to the computing device being interrogated.

In some embodiments, information returned by executing the SQL and script commands can indicate an error status or inefficient resource usage for the interrogated computing device. For example, a lack of batch processes can indicate that certain memory usage/garbage collection batch processes are not being effectively implemented. In another example, the cache status for data tables can indicate inefficient cache usage. In yet another example, database look ups with a number of return values above a threshold can indicate poor processor utilization. In yet another example, the returned patches, fixes, and/or updates can be compared to expected patches, fixes, and/or updates to detect out of date implementations and security vulnerabilities.

Conventional approaches to such computing device interrogation involved manual query and command execution by a skilled user. For example, the skilled user would have to be knowledgeable about a variety of different operating systems, different database implementations, SQL commands specific to a number of different enterprise metadata models, script commands specific to a number of different environmental conditions, and the like. In addition, this skilled user would commonly need to manually interrogate a number of different computing devices, using different commands, in order to understand how an enterprise system is implemented. Such a manual process is both costly and time consuming. Embodiments solve these challenges by providing a robust tool that can automatically interrogate computing devices with a variety of different environmental conditions.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for interrogating a heterogenous computing system using a tool according to an example embodiment. System 100 includes interrogation tool 102, computing devices 104, 106, 108, and cluster of computing devices 110. In some embodiments, computing devices 104, 106, and 108 and cluster of computing devices 110 can be any suitable computing device that implements an enterprise system, such as a server, database, on-premise devices, cloud infrastructure, one or more nodes in a real application cluster ("RAC"), or any other suitable device(s).

In some embodiments, computing devices 104, 106, and 108 and cluster of computing devices 110 can include a different mix of environmental variables, such as OS, presence of a database, application instances, custom implementations on top of the application instances, batch process schedules, and the like. Interrogation tool 102 can be configured to interrogate each of these differing devices in the presence of the differing environmental conditions. For example, enterprise functionality can often generate layers of complexity and heterogenous conditions within a computing device. Interrogation tool 102 can interrogate computing devices 104, 106, and 108 and cluster of computing devices 110 with custom execution that returns system information for each device.

For example, interrogation tool 102 can detect environmental conditions for each of the computing devices. Embodiments of interrogation tool 102 can also build structured query language ("SQL") commands and script commands (e.g., OS specific script commands) designed to interrogate a computing device. Embodiments can then execute the built SQL commands and script commands. For example, the SQL commands and script commands can achieve a computing device specific custom level of execution and return execution information about how the computing device implements various enterprise elements. For example, the returned information can include database execution parameters, application execution parameters, and other pertinent information.

Figure 2:
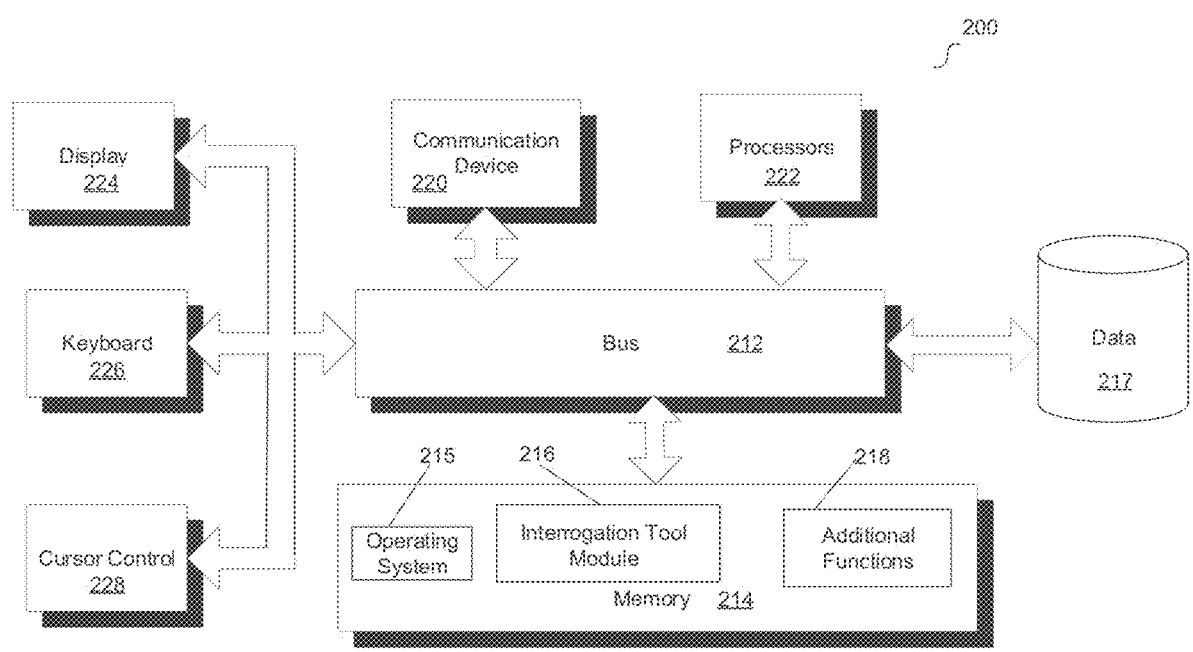
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, interrogation tool module 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, an interrogation tool module 216 that implements the interrogation tool and all other functionality disclosed herein, as well as other applications modules 218. Operating system 215 provides operating system functionality for system 200. In some instances, interrogation tool module 216 may be implemented as an in-memory configuration. In some implementations, when system 200 executes the functionality of interrogation tool module 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Cloud Infrastructure, Oracle® Cloud Platform, Oracle® Cloud Applications, for example. Interrogation tool module 216, other applications module 218, and any other suitable component of system 200 can include various modules of Oracle® Utilities Application Framework ("OUAF") or any other suitable Oracle® Utilities products or services.

A database 217 is coupled to bus 212 to provide centralized storage for modules 216 and 218 and to store, for example, data received by interrogation tool module 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component. Further, when implemented to execute functionality disclosed herein, system 200 is a special purpose computer, specially adapted to provide demand forecasting.

Embodiments load and execute an interrogation tool onto a computing device (or a cluster of computing devices) that implements enterprise software, where the execution of the tool interrogates the computing device based on environmental conditions (e.g., the OS, presence of a database, and the like). Referring back to FIG. 1, interrogation tool 102 can include a script (e.g., Perl script) that is configured to build commands (e.g., SQL commands, OS configured script commands, and the like).

In an embodiment, it may be determined whether the computing device includes a database. When it is determined that a database is included, the interrogation tool can log-in to the database using credentials (e.g., a username and password) that are passed to the tool. In some embodiments, after log-in, interrogation tool 102 can execute built SQL commands that query the database and return state information about the database, including the table space, memory usage, and execution information, such as information about queries that have been run, cached tables, and the like.

In some embodiments, the interrogated computing device can implement enterprise software and/or systems. For example, enterprise software can be a suite of customizable programs that are configured to meet the needs of an organization (rather than an individual). Embodiments of the interrogated computing device implement an Oracle® enterprise software suite and include various entity specific customizations. For example, custom enterprise elements can include custom functionality layered onto the enterprise software that accomplishes specific functionality.

Figure 3A:
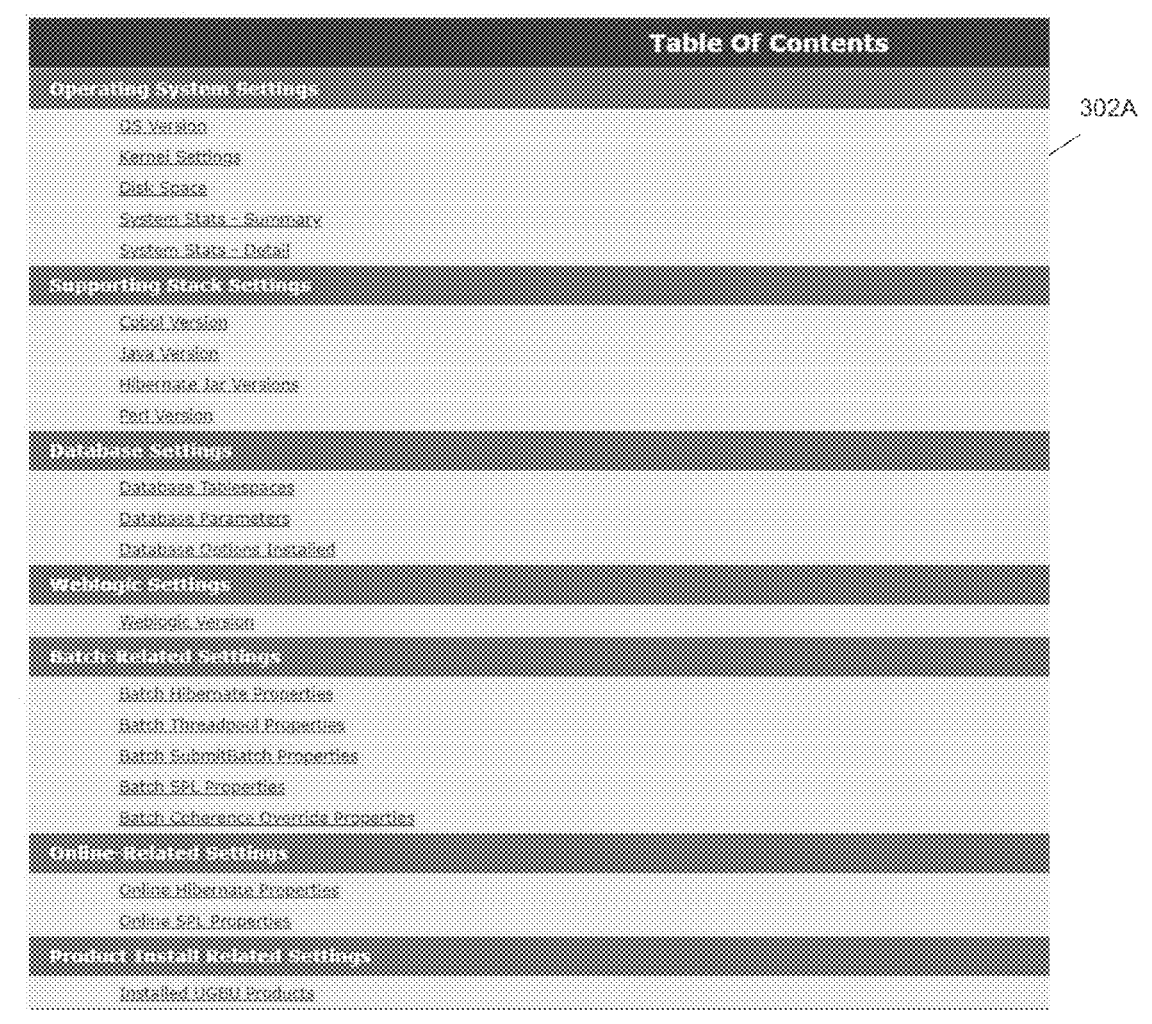

In some embodiments, custom enterprise elements can be detected by the interrogation of the computing device. For example, the custom enterprise elements can include custom applications, modules, portals, zones, and other suitable custom elements. FIGS. 3A-3Q illustrate sample results from interrogating one or more computing devices using a tool according to an example embodiment. For example, FIGS. 3A-3Q include segments of a results document generated by the interrogating. In some embodiments, the results document can be a structured data document (e.g., HTML document), a text document, or any other suitable document.

Figure 3B:
FIGS. 3A-3N and FIGS. 3P-3Q illustrate sample results from interrogating heterogenous computing systems using a tool according to an example embodiment.

FIGS. 3A-3B display a table of contents 302A and 302B for the generated document, which can indicate different results sections for the interrogation. These results sections can include OS settings, stack settings, database settings, weblogic settings, batch settings, online settings, installed product settings, display layout settings, custom components, batch analytics, product health check, installed fixes, and any other suitable sections.

Figure 3C:
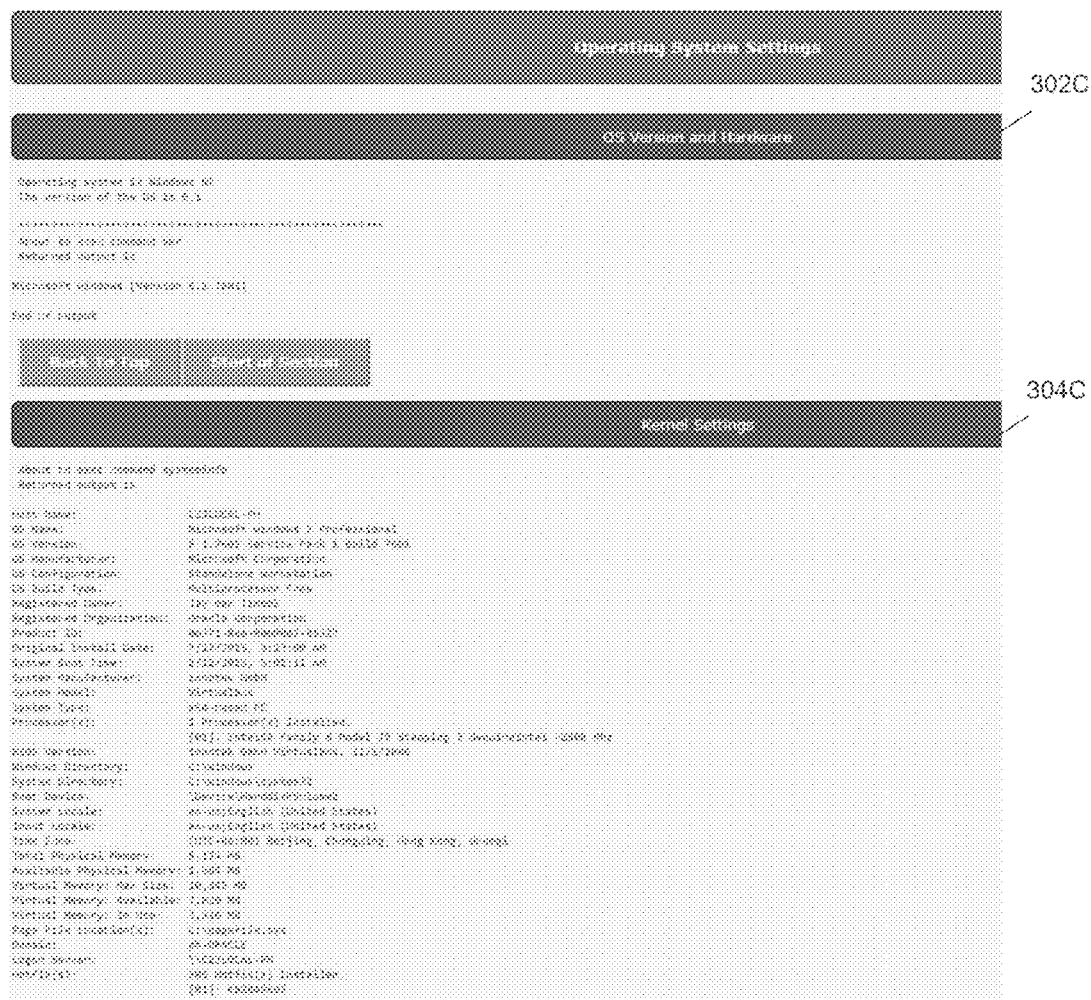
Figure 3D:
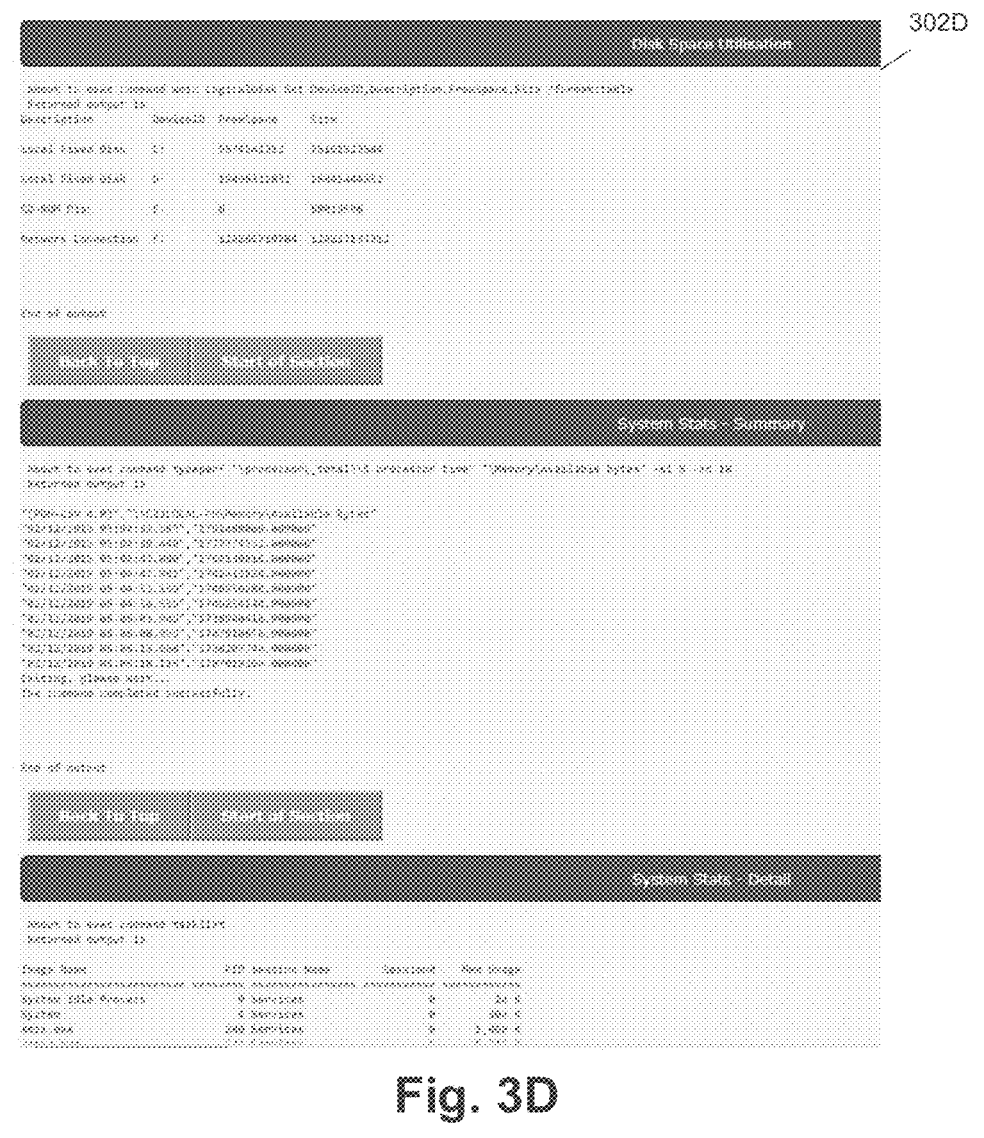

FIG. 3C displays OS system settings 302C, including the OS version, and kernel settings 304C, including host name, OS version, install date, system manufacturer, processor information, bios version, windows directory, system memory information, and the like. FIG. 3D displays disk space utilization 302D, including local disks (e.g., local disk drive, CD drives, other storage devices, and the like), the sizes of these disks, and the free space available.

Figure 3E:
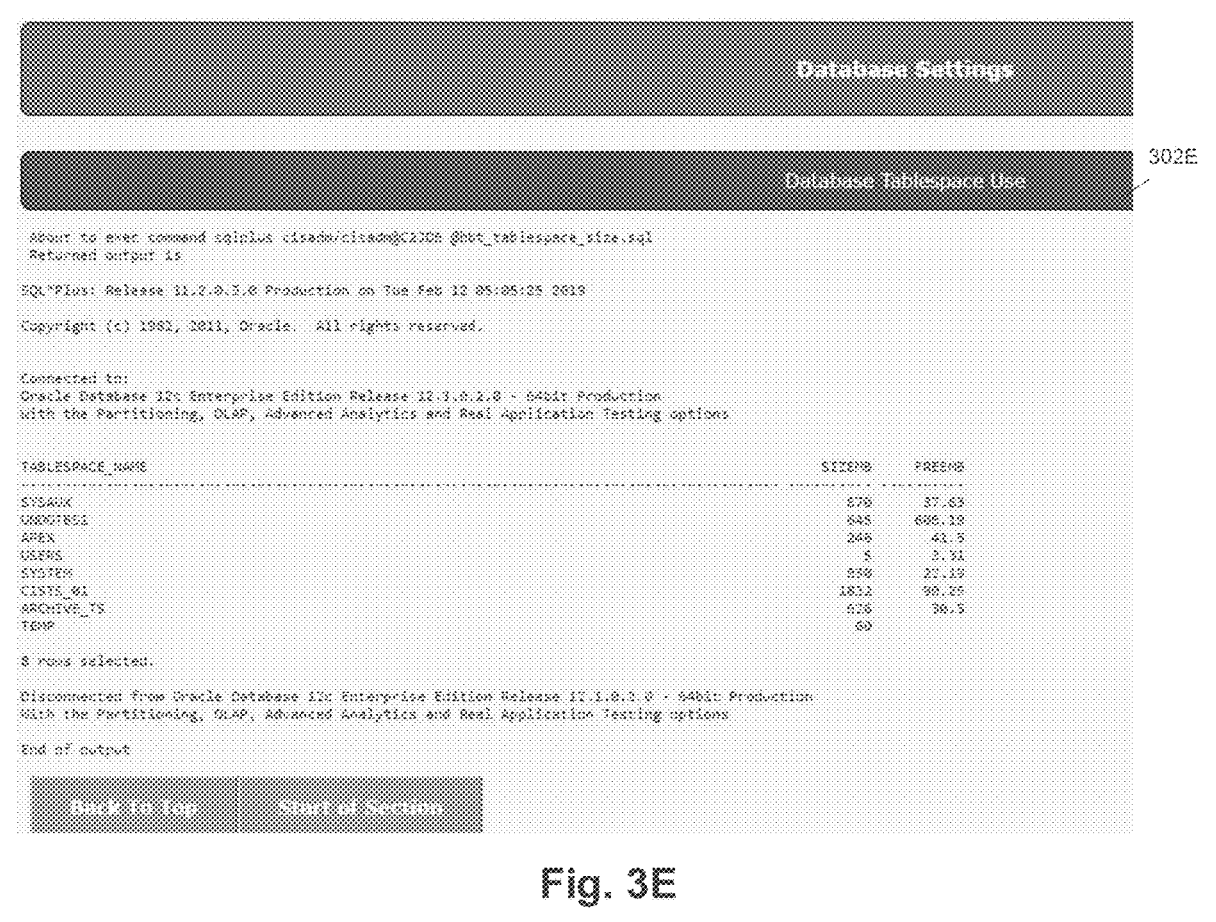

FIG. 3E displays database table space 302E, including the names of tables in the tablespace, their size, and their free space. In an embodiment, the interrogation tool first logs-in to the database before retrieving the tablespace information, and includes information about the database within the database settings section.

Figure 3H:
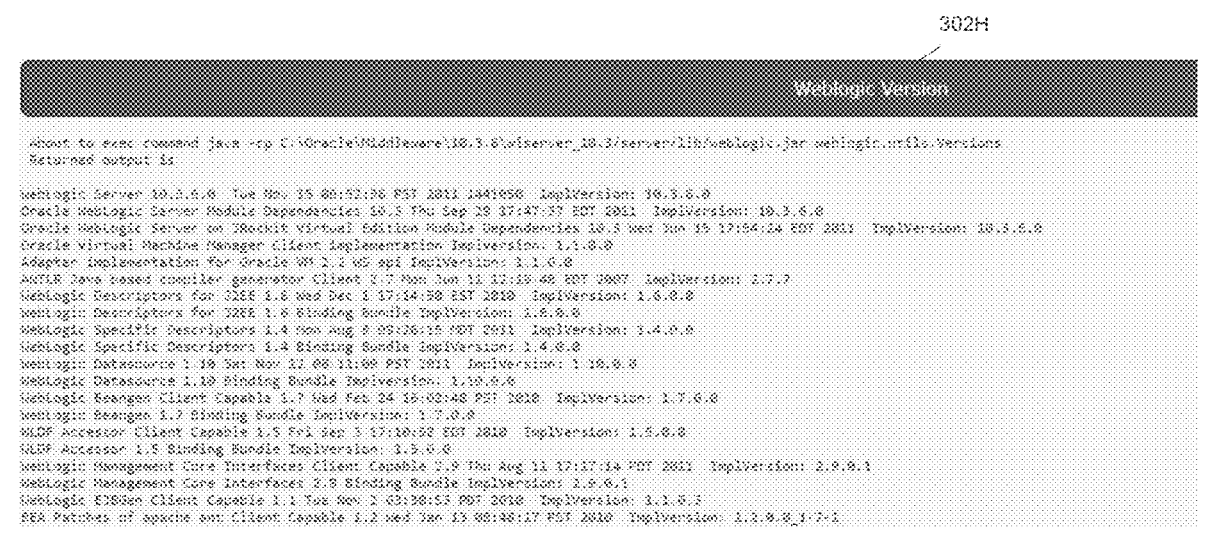

FIG. 3F displays database parameters 302, including parameters relating to cache settings, database file locations, database system restrictions (e.g., maximum number of open cursors allowed), and the like. FIG. 3G displays database options installed 302G, including the feature names for options installed for the database. FIG. 3H displays weblogic verson 302H, including the versions of the weblogic software (or any other suitable server software) installed on the system.

Figure 3I:
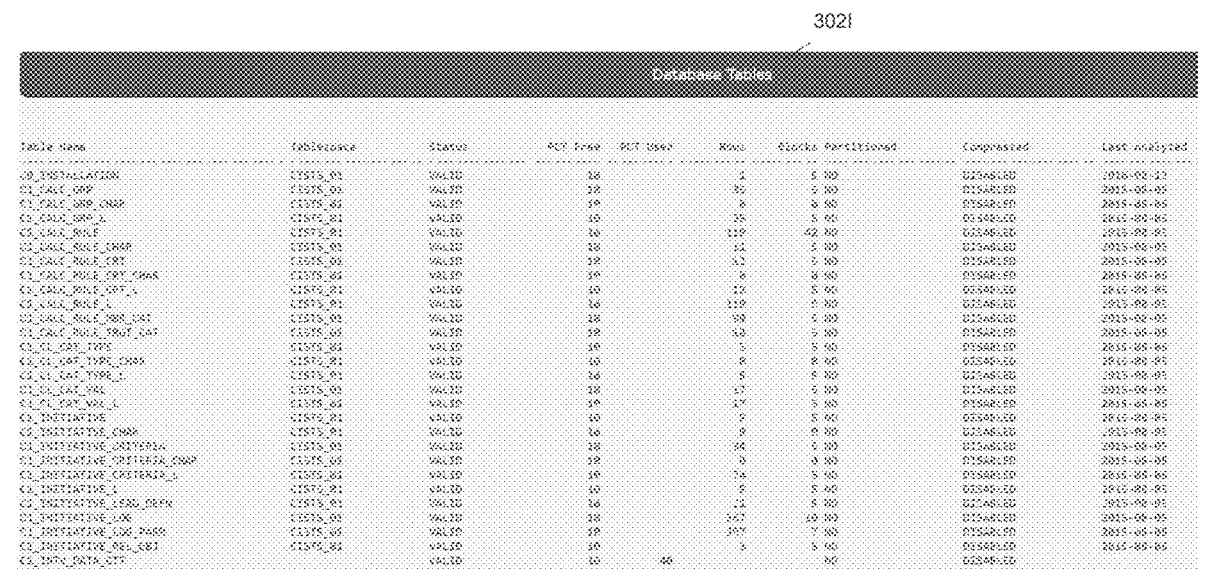
Figure 3J:
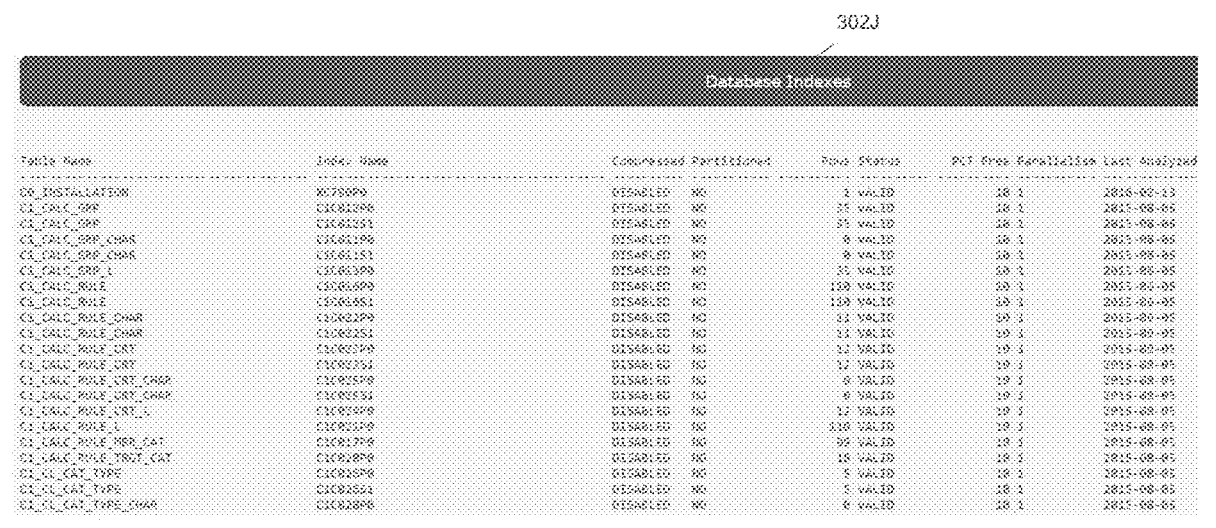

FIG. 3I displays database tables 302I, including the table names within the database, the tablespace for the tables, the number of rows for the tables, the partition and compression state, and the like. FIG. 3J displays database indexes 302J, including that database index and corresponding table name, compression and partition state, table rows (e.g. number of rows), and the like.

FIG. 3K displays batch codes 302K, including batch codes not run over a period of time (e.g., 200 days), name of the batch code, and the relevant program. Embodiments also include a batch codes run over a period of time section, which includes name of the batch code run over that period of time, and the relevant program.

Figure 3L:
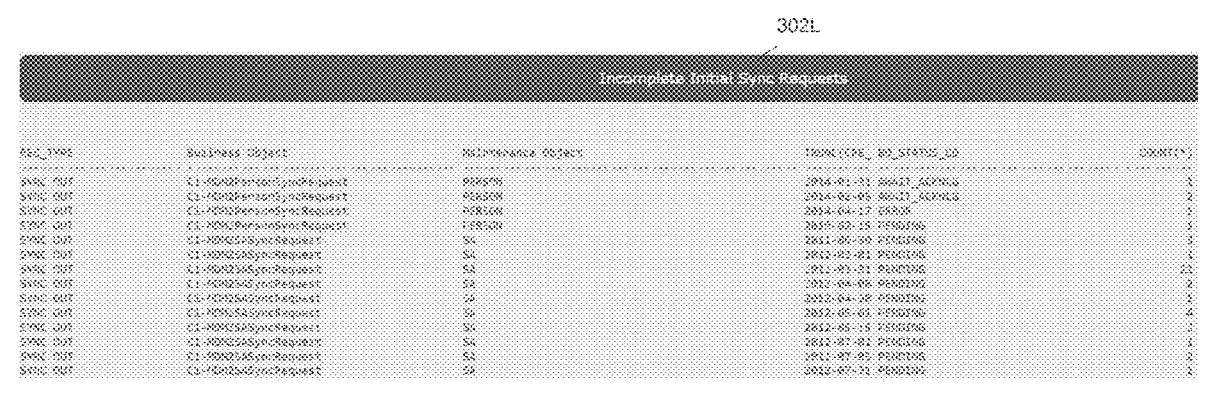

FIG. 3L displays incomplete sync requests 302L, including business objects (and their maintenance object) that have experienced incomplete sync requests, along with the status of the request and the count for a number of requests. FIG. 3M displays 10 week analysis of processing exceptions encountered in this system instance 302L, categorized by exception type, such as monitor budget errors, help ticket, self-service task errors, and the like.

Figure 3P:
Figure 3Q:
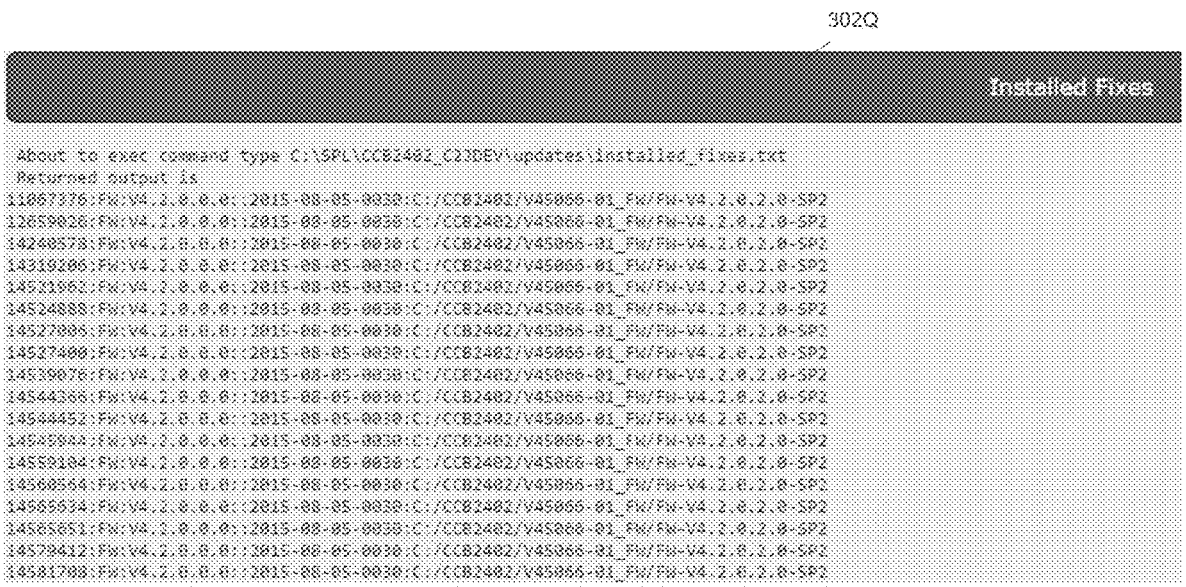

FIG. 3N displays cached tables 302N, including database tables, the status of the cache flag, and the cache mode (e.g., cached for batch). FIG. 3P displays database fixes 302L, including the version, date, and name for installed database fixes. FIG. 3Q displays installed fixes 302L, including the version, date, and name for system fixes.

In some embodiments, interrogation tool 102 of FIG. 1 can detect environmental conditions for the interrogated computing device and build commands based on these environmental conditions. For example, environmental conditions can include an operating system (e.g., windows 32, windows 64, Advanced Interactive eXecutive ("AIX"), solaris, linux, and the like), the presence of a database, versions for loaded software (e.g., Java version, Cobol version, Perl, Oracle® software versions, and the like), hardware information, kernel information and settings, disk space utilization, and the like.

In some embodiments, the operating system can be detected based on system configuration information or files. For example, interrogation tool 102 can be a Perl script in some embodiments, and the script can access the operating system running on the computing device based on the Config class/file/module (e.g., by accessing the "osname" variable of the Perl Config module). Some embodiments may implement other functionality to detect the operating system.

In some embodiments, script commands configured to interrogate the computing device can be built based on the detected environmental conditions. For example, OS commands can be built according to the detected OS for the computing device. Example built OS commands based on the detected OS and other environment variables can be:

```
if ($opSys eq "MSWin32") {
    $opSys = "win";
    if(defined $ENV('WL_HOME'}) {
        $wlversion_cmd = "java -cp $WL_HOME/server/lib/weblogic.jar
weblogic.utils.Versions" if -f "$WL_HOME/server/lib/weblogic.jar";
    }
    $diskspace_cmd = "wmic LogicalDisk Get
DeviceID,Description,FreeSpace,Size /format:table";
    $sysstats_summ_cmd = join('',"typeperf ", chr(34),
"\\processor(_total)\\%% processor time", chr(34), " ", chr(34), "\\Memory\\Available
bytes", chr(34), "-si 5 -sc 10 ");
    $os_kernel_cmd = "systeminfo";
    $sysstats_dtl_cmd = "tasklist";
    $installedfixes_cmd = "type $SPLEBASE\\etc\\installed_fixes.txt" if -f
"$SPLEBASE\\etc\\installed_fixes.txt";
    $installedfixes_cmd = "type $SPLEBASE\\updates\\installed_fixes.txt" if -f
"$SPLEBASE\\updates\\installed_fixes.txt";
    $ohibernate_cmd = "type
$SPLEBASE\\etc\\conf\\service\\hibernate.properties";
    $bhibernate_cmd = "type
$SPLEBASE\\splapp\\standalone\\config\\hibernate.properties";
    $olog4j_cmd = " ";
    $blog4j_cmd = " ";
    $cover_cmd = "type output.txt; del output.txt";
    $cover_filename =
"$SPLEBASE\\splapp\\standalone\\config\\tangosol-coherence-override.xml";
    $java_instances = " ";
    $welogic_config cmd = " ";
    if($cobolDir gt " ") {
        $cversion_cmd = "type $cobolDir\\cobver";
    }
}
if ($opSys eq "win64") {
    $opSys = "win";
    if(defined $ENV{'WL_HOME'} ) {
```

```
    $wlversion_cmd = "java -cp $WL_HOME/server/lib/weblogic.jar
weblogic.utils.Versions" if -f "$WL_HOME/server/lib/weblogic.jar";
        }
    $diskspace_cmd = "wmic LogicalDisk Get
DeviceID,Description,FreeSpace,Size /format:table";
    $sysstats_summ_cmd = join("","typeperf " , chr(34),
"\\processor(_total)\\%% processor time", chr(34), " ",chr(34), "\\Memory\\Available
bytes", chr(34), " -si 5 -sc 10 ");
    $os_kernel_cmd = "systeminfo";
    $sysstats_dtl_cmd = "tasklist";
    $installedfixes_cmd = "type $SPLEBASE\\etc\\installed_fixes.txt" if -f
"$SPLEBASE\\etc\\installed_fixes.txt";
    $installedfixes_cmd = "type $SPLEBASE\\updates\\installed_fixes.txt" if -f
"$SPLEBASE\\updates\\installed_fixes.txt";
    $ohibernate_cmd = "type
$SPLEBASE\\etc\\conf\\service\\hibernate.properties";
    $bhibernate_cmd = "type
$SPLEBASE\\splapp\\standalone\\config\\hibernate.properties";
        $olog4j_cmd = " ";
        $blog4j_cmd = " ";
        $cover_cmd = "type output.txt; del output.txt";
        $cover_filename =
"$SPLEBASE\\splapp\\standalone\\config\\tangosol-coherence-override.xml";
        $java_instances = " ";
        $welogic_config_cmd = " ";
    if($cobolDir gt " ") {
            $cversion_cmd ="type $cobolDir\\cobver";
        }
    }
    if ($opSys eq "aix") {
        if(defined $ENV{'WL_HOME'}) {
            $wlversion_cmd = "java -cp $WL_HOME/server/lib/weblogic.jar
weblogic.utils.Versions" if -f "$WL_HOME/server/lib/weblogic.jar";
        }
    $diskspace_cmd = "df -g";
    $sysstats_summ cmd = " ";
    $os_kernel cmd = "Isattr -E -I sys0";
    $sysstats_dtl_cmd = " ";
    $installedfixes_cmd = "cat $SPLEBASE/etc/installed_fixes.txt" if -f
"$SPLEBASE/etc/installed_fixes.txt";
    $installedfixes_cmd = "cat $SPLEBASE/updates/installed_fixes.txt" if -f
"$SPLEBASE/updates/installed_fixes.txt";
    $ohibernate_cmd = "cat $SPLEBASE/etc/conf/service/hibernate.properties";
    $bhibernate_cmd = "cat
$SPLEBASE/splapp/standalone/config/hibernate.properties";
        $olog4j_cmd = "perl -plwe 's/%/[PERC]/g'
$SPLEBASE/splapp/businessapp/properties/log4j*.properties > output.txt;cat output.txt;
rm output.txt";
        $blog4j_cmd = "perl -plwe 's/%/[PERC]/g'
$SPLEBASE/splapp/standalone/config/log41*.properties > output.txt;cat output.txt; rm
output.txt";
        $cover_cmd = "cat output.txt; rm output.txt";
        $cover_filename =
"$SPLEBASE/splapp/standalone/config/tangosol-coherence-override.xml";
        $java_instances = "ps -ef / grep java";
        $welogic_config cmd = "find $WL_HOME -print > /tmp/files.lst; find
$SPLEBASE -print >> /tmp/files.lst; grep config/config.xml /tmp/files.lst/ grep -v tmp /
grep -v appViewer /grep -v Trash / grep -v admin > /tmp/output.txt;perl -plwe 's//cat /'
/tmp/output.txt > /tmp/output2.txt;chmod 777 /tmp/output2.txt; /tmp/output2.txt >
/tmp/output3.txt";
        $welogic_config_cmd2 = "cat /tmp/formatted_Weblogic.properties";
        $welogic_config_cmd3 = "rm /tmp/files.lst;rm
/tmp/formatted Weblogic.properties;rm /tmp/output3.txt;rm /tmp/output2.txt;rm
/tmp/output.txt";
        if($cobolDir gt " ") {
            $cversion cmd = "cat $cobolDir/etc/cobver";
        }
    }
    if ($opSys eq "solaris" or $opSys eq "sunos") {
        if(defined $ENV{'WL_HOME}) {
            $wlversion_cmd = "java -cp $WL_HOME/server/lib/weblogic.jar
weblogic.utils.Versions" if -f "$WL_HOME/server/lib/weblogic.jar";
        }
        $diskspace_cmd = "df -h";
        $sysstats_summ_cmd = "sar / sed s/%/#/g";
```

-continued

```
        $os_kernel_cmd = "sysdef -i";
        $sysstats_dtl_cmd = "sar -rdpucA";
        $installedfixes_cmd = "cat $SPLEBASE/etc/installed_fixes.txt" if -f
"$SPLEBASE/etc/installed_fixes.txt";
        $installedfixes_cmd = "cat $SPLEBASE/updates/installed_fixes.txt" if -f
"$SPLEBASE/updates/installed_fixes.txt";
        $ohibernate_cmd = "cat $SPLEBASE/etc/conf/service/hibernate.properties";
        $bhibernate_cmd = "cat
$SPLEBASE/splapp/standalone/config/hibernate.properties";
        $olog4j_cmd = "perl -plwe 's/%/[PERC]/g'
$SPLEBASE/splapp/businessapp/properties/log4j*.properties > output.txt;cat output.txt;
rm output.txt";
        $blog4l_cmd = "perl -plwe 's/%/[PERC]/g'
$SPLEBASE/splapp/standalone/config/log4j*.properties > output.txt;cat output.txt; rm
output.txt";
        $cover_cmd = "cat output.txt; rm output.txt";
        $cover_filename =
"$SPLEBASE/splapp/standalone/config/tangosol-coherence-override.xml";
        $java_instances = "ps -ef / grep java";
        $welogic_config_cmd = "find $WL_HOME -print > /tmp/files.lst; find
$SPLEBASE -print >> /tmp/files.lst; grep config/config.xml /tmp/files.lst/ grep -v tmp /
grep -v appViewer / grep -v Trash / grep -v admin > /tmp/output.txt;perl -plwe 's//cat /'
/tmp/output.txt > /tmp/output2.txt;chmod 777 /tmp/output2.txt; /tmp/output2.txt >
/tmp/output3.txt";
        $welogic_config_cmd2 = "cat /tmp/formatted_Weblogic.properties";
        $welogic_config_cmd3 = "rm
/tmp/formatted_Weblogic.properties;rm /tmp/output3.txt;rm /tmp/output2.txt;rm
/tmp/output.txt";
      if($cobolDir gt " ") {
          $cversion_cmd = "cat $cobolDir/etc/cobver";
        }
      }
  if ($opSys eq "linux"){
      if(defined $ENV{'WL_HOME'}) {
        $w/version_cmd = "java -cp $WL_HOME/server/lib/weblogic.jar
weblogic.utils.Versions" if -f "$WL_HOME/server/lib/weblogic.jar";
        }
      $diskspace_cmd = "df -h";
      $sysstats_summ_cmd = "sar / sed s/%/#/g";
      $os_kernel_cmd = "/sbin/sysctl -a";
      $sysstats_dtl_cmd = "sar -rBdp -n ALL";
      $installedfixes_cmd = "cat $SPLEBASE/etc/installed_fixes.txt" if -f
"$SPLEBASE/etc/installed_fixes.txt";
      $installedfixes_cmd = "cat $SPLEBASE/updates/installed_fixes.txt" if -f
"$SPLEBASE/updates/installed_fixes.txt";
      $ohibernate_cmd = "cat $SPLEBASE/etc/conf/service/hibernate.properties";
    $bhibernate_cmd = "cat
$SPLEBASE/splapp/standalone/config/hibernate.properties";
      $blog4j_cmd = "perl -plwe 's/%/[PERC]/g'
$SPLEBASE/splapp/businessapp/properties/log4j*.properties > output.txt;cat output.txt;
rm output.txt";
      $blog4j_cmd = "perl -plwe 's/%/[PERC]/g'
$SPLEBASE/splapp/standalone/config/log4j*.properties > output.txt;cat output.txt; rm
output.txt";
      $cover_cmd = "cat output.txt; rm output.txt";
      $cover_filename =
"$SPLEBASE/splapp/standalone/config/tangosol-coherence-override.xml";
      $java_instances = "ps -ef / grep java";
      $welogic_config_cmd = "find $WL_HOME -print > /tmp/files.lst; find
$SPLEBASE -print >> /tmp/files.lst; grep config/config.xml /tmp/files.lst / grep -v tmp /
grep -v appViewer / grep -v Trash / grep -v admin > /tmp/output.txt;perl -plwe 's//cat /'
/tmp/output.txt > /tmp/output2.txt;chmod 777 /tmp/output2.txt; /tmp/output2.txt >
/tmp/output3.txt";
      $welogic_config_cmd2 = "cat /tmp/formatted_Weblogic.properties";
      $welogic_config_cmd3 = "rm
/tmp/formatted_Weblogic.properties;rm /tmp/output3.txt;rm /tmp/output2.txt;rm
/tmp/output.txt";
    if($cobolDir gt " ") {
          $cversion_cmd = "cat $cobolDir/etc/cobver";
        }
      }
```

In some embodiments, these built script commands can be sequentially executed to interrogate and return information about the computing device. For example, the following code can execute the built script commands "os_kernel_cmd" and "diskspace_cmd", both built based on the detected operating system, as described above:

```
if($os_kernel_cmd gt " ") {
    print("Extracting Kernel Settings..."."\n");
    execCommand( $os_kernel_cmd, $logFile, "no die", "");
    logMsg("");
}
if($diskspace_cmd gt " ") {
    print("Extracting Disk Allocation..."."\n");
    execCommand( $diskspace_cmd, $logFile, "no die", "");
    logMsg("");
}
```

In some embodiments, an enterprise computing system can include computing devices with a utilities framework installed that organizes the various aspects of the system. An example utilities framework is Oracle® Utilities Application Framework ("OUAF"), and any other suitable framework can be implemented. In an embodiment OUAF can be used to store information (e.g., metadata) about the various aspects of enterprise software installed/running on a particular computing device. In other words, OUAF can be used across different enterprise computing devices to organize the relevant enterprise software implemented.

Figure 4:
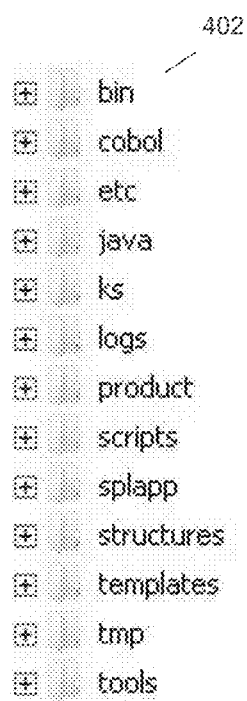
FIG. 4 illustrates a directory structure for an enterprise framework according to an example embodiment.

FIG. 4 illustrates a directory structure for an enterprise framework according to an example embodiment. For example, the utilities framework implemented on an enterprise computing device can store information (e.g., metadata), scripts, and other suitable components of the enterprise software on the computing device within the folders of directory 402. In some embodiments, one of more of the folders can include subfolders and/or subdirectories to organize the enterprise information, scripts, and other components.

Figure 5:
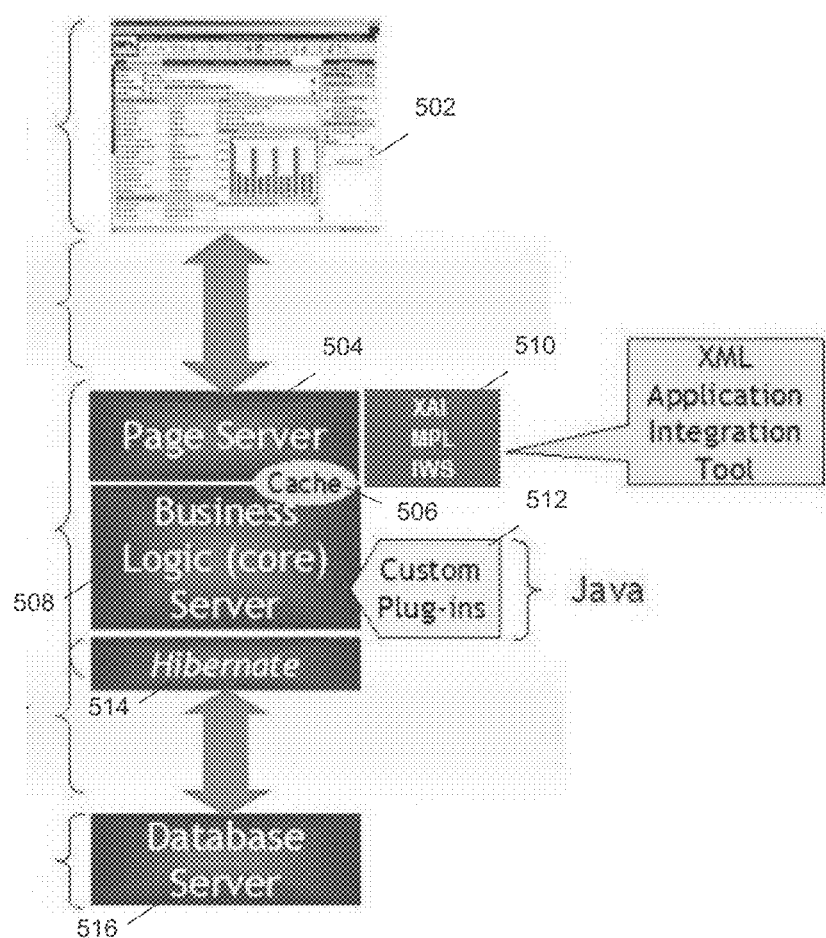
FIG. 5 illustrates a system for an enterprise framework according to an example embodiment.

FIG. 5 illustrates a system for an enterprise framework according to an example embodiment. The system of FIG. 5 includes user interfaces 502, server 504, cache 506, business logic 508, integration tool 510, plug-ins 512, hibernate 514, and database server 516. For example, information can be presented in a web browser using web technologies (e.g., HTML and JavaScript) through user interfaces 502. The browser can communicate with a server 504, such as with a Web Application Server via HTTP. In some embodiments, server 504 can be include a number logical tiers: presentation services, business logic, and data access. For example, inbound HTTP requests can be handled by a web technology component (e.g., Java Servlets) in the presentation layer, which may in turn invoke data service objects. These objects may route control to Java-based business entities, such as business logic 508 and plug-ins 512, which can use hibernate 514 and the corresponding framework for data access and persistence.

In some embodiments, various data (e.g., control tables for drop-down menus, language-specific messages/labels, and the like) can be stored in cache 506 in the presentation layer of server 504. In some embodiments, the presentation layer can make use of XSLT technology to create HTML for the user interfaces 502. Several "pages" may be used to show the relevant information relating to a particular business entity, a JavaScript "model" can be used to manage the data, and a suitable web technology (e.g., Internet Explorer XMLHTTP object) can be used to send the data to server 504 as an XML document. In some embodiments, data can be provided to a web browser as JavaScript. Specialized portal and dashboard areas can use server-side XSLT technology to render the HTML directly on the server. In some embodiments, HTML for grids in the browser can be created using client-side MSXML XSLT transforms. For example, this kind of architecture can be described as Asynchronous JavaScript and XML ("AJAX"). Various aspects of these web technologies used to render and communicate with user interfaces 502 can part of integration tool 510.

Embodiments of the enterprise framework store metadata to manage the enterprise components on a computing device. The metadata used by the framework can include program variables, program locations, program elements, menu options, navigation keys, tables and fields, and many more. In some embodiments, the metadata can be split into distinct groupings.

Figure 6A:
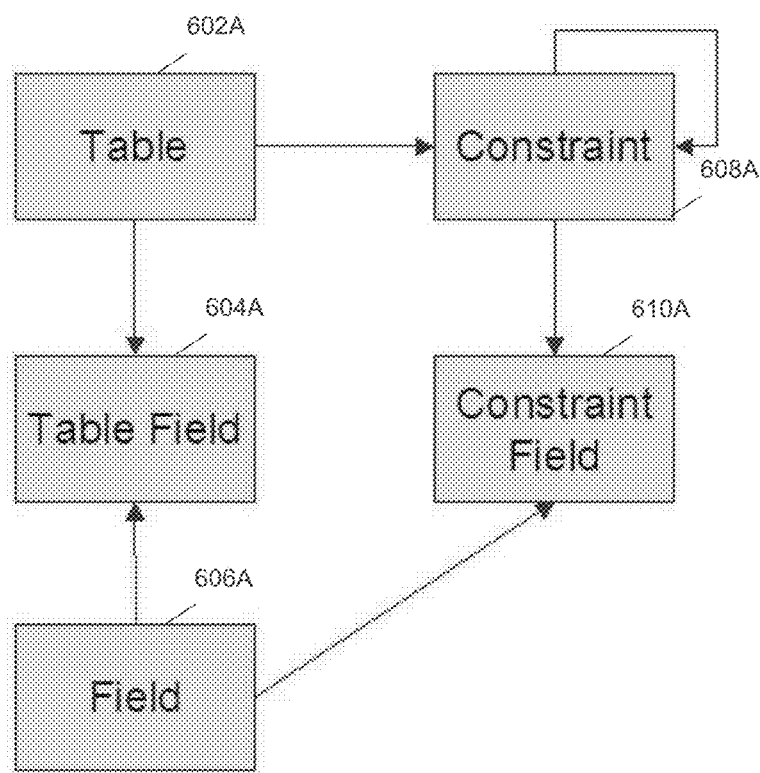
FIGS. 6A-6C illustrate metadata models for an enterprise framework according to an example embodiment.
Figure 6B:
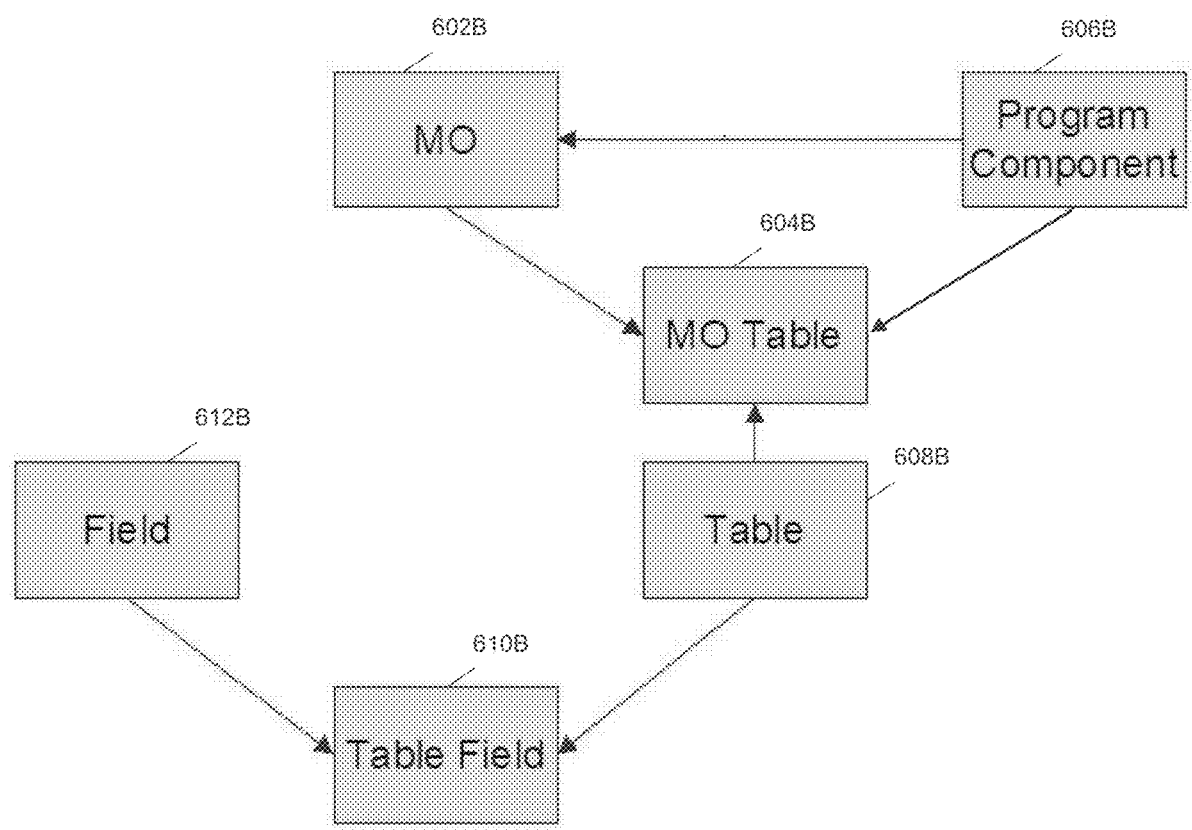
Figure 6C:
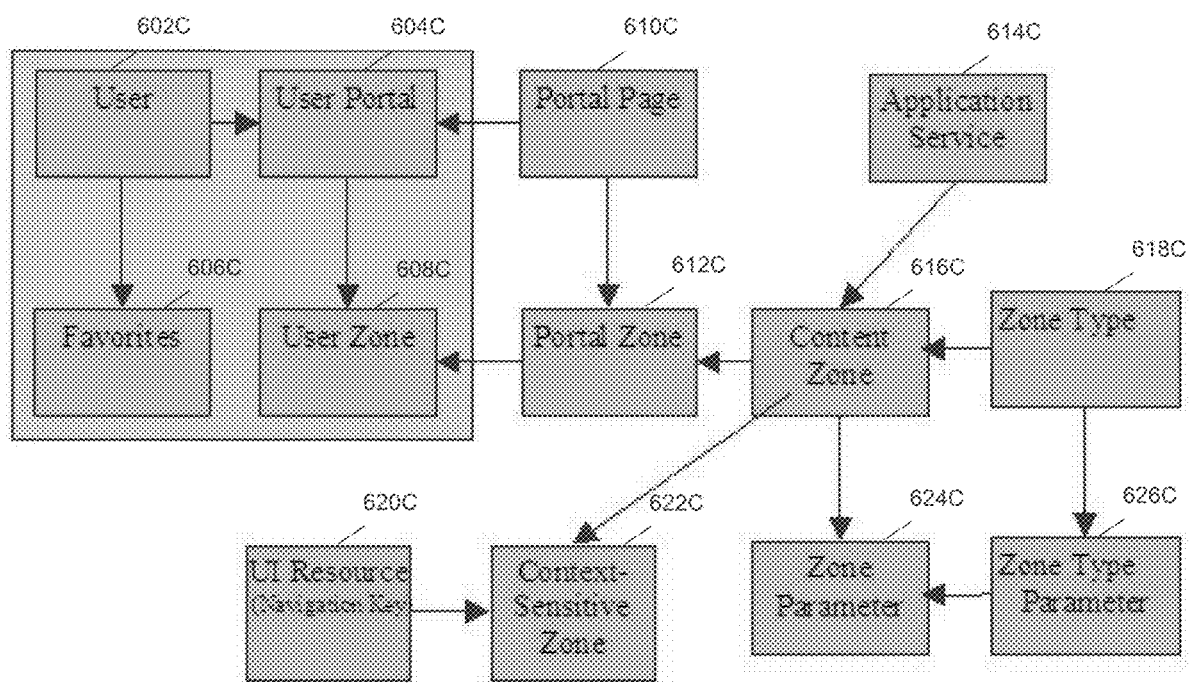

FIGS. 6A-6C illustrate metadata models for an enterprise framework according to an example embodiment. FIG. 6A displays a metadata model for a database table within the enterprise framework. For example, the model includes the following metadata: table 602A, table field 604A, field 606A, constraint 608A, and constraint field 610A. FIG. 6A further demonstrates the relationships amongst these pieces of metadata. For example, the metadata model includes which fields are part the table (e.g., table field 604A) and business rules for the fields. Constraint 608A can define the keys of tables and can also define relationships between tables. Constraint fields 610A can specify the fields involved in the keys or relationships between tables. Any other suitable metadata model for a database table can be implemented.

FIG. 6B displays a metadata model for a maintenance object within the enterprise framework. In some embodiments, a maintenance object represents a group of tables maintained together within the framework. For example, maintenance objects can be used by enterprise software components to group database tables for performance benefits (e.g., for resource efficiency when performing certain functions, such as archiving or purging). In some embodiments, maintenance objects have at least one associated table (e.g., a primary table, sometimes referred to as the root table). Maintenance objects can also include child tables associated with the primary table (e.g., a language table, person name table (child of person table), and the like). In some embodiments, a Table Role can specify whether the table is a child or a primary.

For example, the model depicted in FIG. 6B includes the following metadata: maintenance object 602B, maintenance object table 604B, program component 606B, table 608B, table field 610B, and field 612B. FIG. 6B further demonstrates the relationships amongst these pieces of metadata. Any other suitable metadata model for a maintenance object can be implemented.

FIG. 6C displays a metadata model for custom zones within the enterprise framework. In some embodiments, custom zones can be implemented as pieces of a portal HTML page. A portal can include an Oracle® software dashboard. For example, a dashboard can have one or more pages that display results of an analysis (e.g., an analysis of business data or business objects). For example, a Sales Performance dashboard can add content to track a team's revenue. Consider that three views can be created for an analysis: performance tile view, a table view, and treemap view. A dashboard that displays these three views can be created and prompts on the dashboard can be configured to enable users to specify the values to display in the views.

In some embodiments, the portal can implement zones that include custom content. For example, the portal framework can wrap each zone inside an HTML div element and can provide a title bar and collapse/expand widgets. In some embodiments, zones can be configured to be initially collapsed when the portal page loads, and then execute a deferred load when they are expanded.

Zones can depend on one or more global context keys. These keys can be derived from a global context lookup (e.g., lookup values that each application defines for itself). When a web application server boots, the application can enumerate the available lookup values and make this information available to the browser. For example, Oracle® Utilities Customer Care and Billing has ACCT_ID, PER_ID and PREM_ID as its global context keys. In some embodiments, context-sensitive zones can depend on model keys. For performance reasons, zones can be reloaded intelligently as needed. Hence, non-context dashboard zones can redisplay when one of the context keys changes.

In an example, a custom zone within a portal can be a query zone. A query zones can execute SQL statement(s) (e.g., with appropriate filters). A zone can include a zone type which determines how it is processed. A zone can be housed in one or more portals and/or a portal can also contain one or more zones. In some embodiments, zones and portals are subject to security, like other objects. In an example, the order of zones in a portal can be specified by the user or the portal.

In some embodiments, a custom zone can retrieve enterprise data and generate visualizations in a browser. For example, parameters for a custom zone can be defined by a user. The parameters can be used to execute SQL, retrieve enterprise data, and display the data. For example, the data can be displayed in a table, graph, or any other suitable display or visualization. In some embodiments, the custom zone can include custom algorithms and/or scripts, for example that manipulate the retrieved enterprise data. The manipulated data can be used to generate the visualizations. In some embodiments, one or more of the custom zones can be defined for pages of a portal.

For example, the custom zone model depicted in FIG. 6C includes the following metadata: user 602C, user portal 604C, favorites 606C, user zone 608C, portal page 610C, portal zone 612C, application service 614C, content zone 616C, zone type 618C, UI resource 620C, context-sensitive zone 622C, zone parameter 624C, and zone type parameter 626C. FIG. 6C further demonstrates the relationships amongst these pieces of metadata. Any other suitable metadata model for a custom zone can be implemented.

Other enterprise software elements can similarly include metadata models. For example, a metadata model can be implemented for a batch process, where the metadata defines use conditions and/or a structure for the batch process.

In some embodiments, a user can define metadata for enterprise software components to be generated. The generation process can apply the metadata to generator templates to create a deployable component, along with any relevant infrastructure changes. For example, metadata can be defined to implement database tables, maintenance objects, custom zones, a batch process, and the like. An enterprise framework such as Oracle® Utilities Application Framework can implement an enterprise element generator that builds elements based on defined metadata.

Figure 7A:
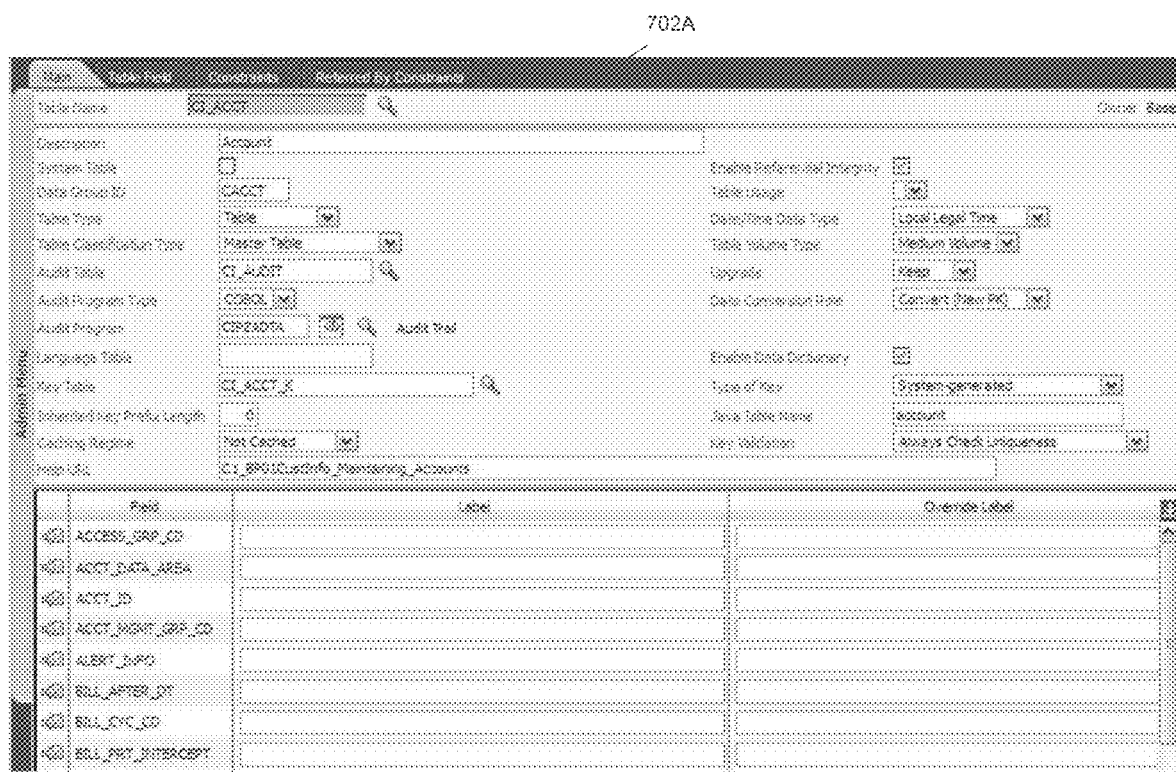

FIGS. 7A-7E illustrate sample user interfaces for an enterprise framework according to an example embodiment. FIG. 7A displays a user interface for defining metadata for a table. For example, user interface 702A includes user interface elements for defining a table name, a description, a table type, a table classification, table keys, fields for the table, and the others. In an embodiment, a user can input information about a table into user interface 702A such that a data table is generated within the enterprise framework. The enterprise framework can then store the metadata for the database table (e.g., within the database itself and within the directory structure illustrated in FIG. 4).

Figure 7B:
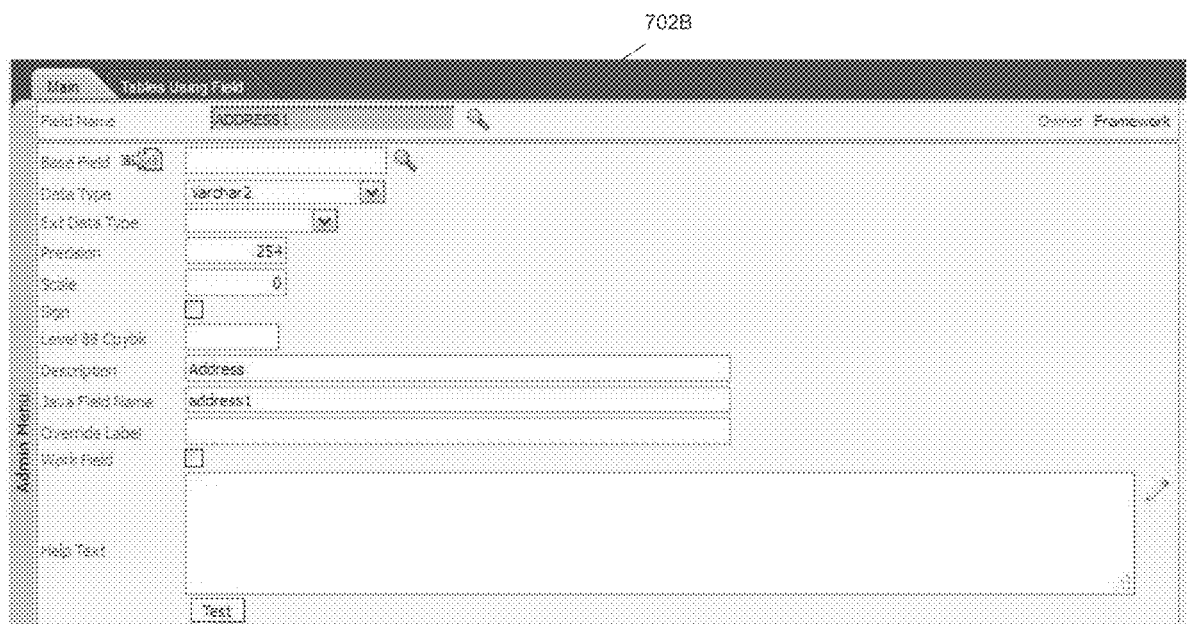
Figure 7C:
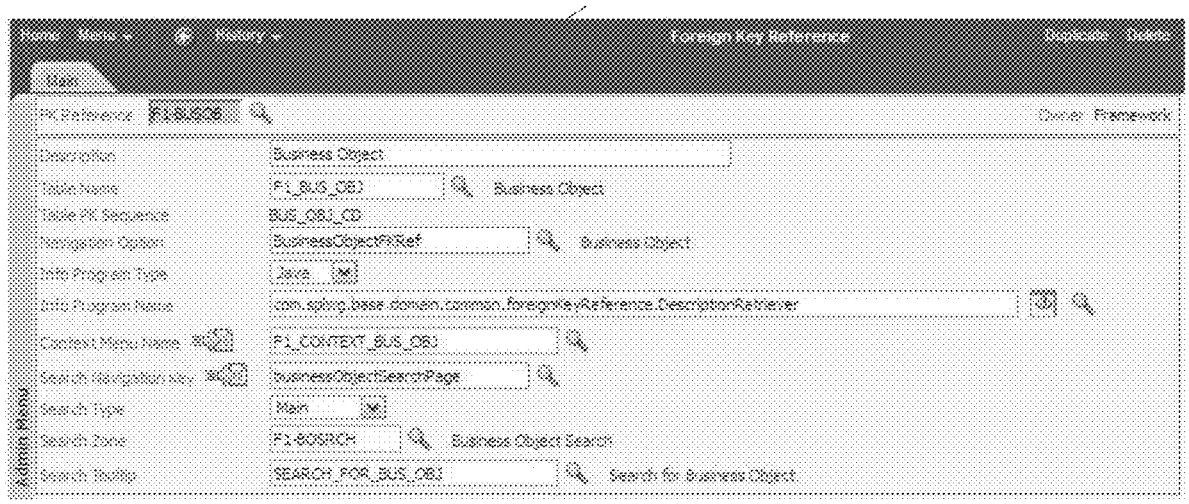

FIG. 7B displays a user interface for defining metadata for a field for a table. For example, user interface 702B includes user interface elements for defining a field name, a data type, a description, and the others. FIG. 7C displays a user interface for defining metadata for a foreign key for a table. For example, user interface 702C includes user interface elements for defining a foreign key reference, a description, a table name for the foreign key, a search type, a search zone, a table primary key, and others.

In an embodiment, a user can input information about a table into user interface 702A, including inputting field information into user interface 702B and foreign key information into user interface 702C, such that a database table is generated within the enterprise framework (e.g., including relevant fields and keys). The enterprise framework can then store the metadata for the database table, for example, within the database itself and/or within the directory structure illustrated in FIG. 4.

Figure 7D:
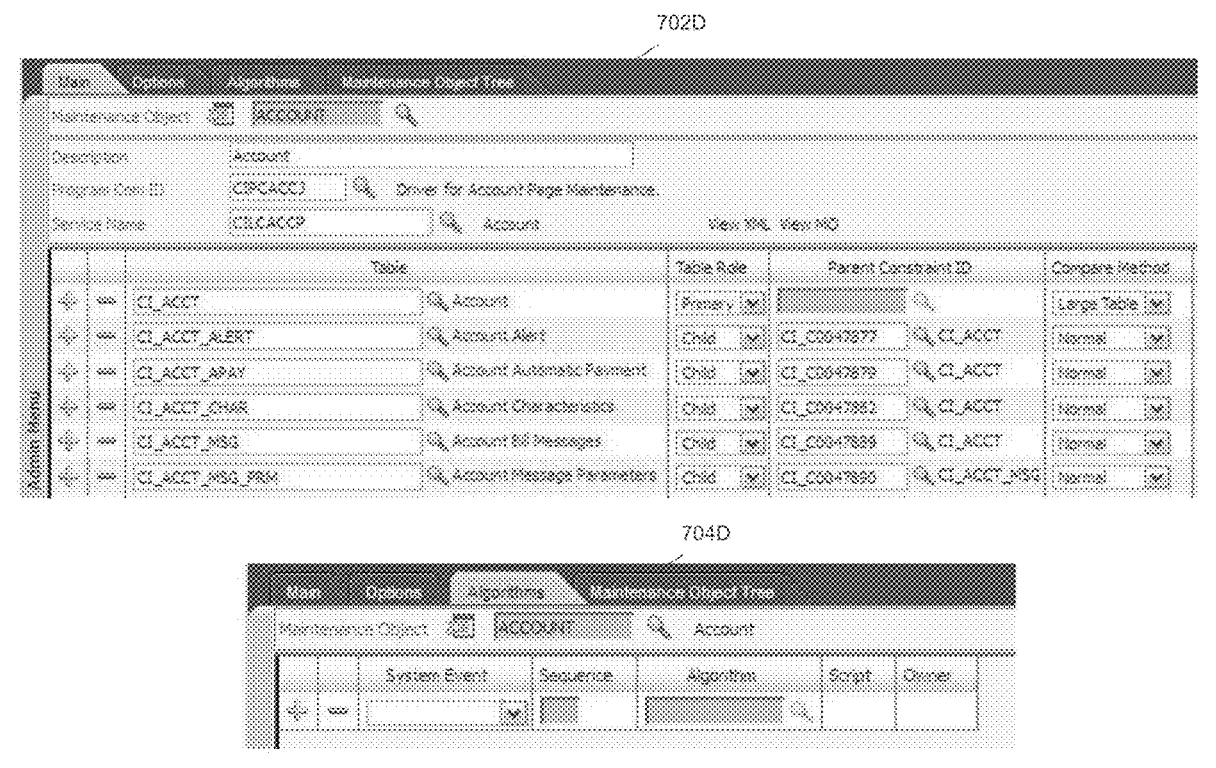

FIG. 7D displays a user interface for defining metadata for a maintenance object. For example, user interface 702D includes user interface elements for defining a maintenance object, a description, a program ID, tables for the maintenance object, the table roles within in the maintenance object (e.g., primary, child, and the like), and others. User interface 704D includes a user interface for defining algorithms for a maintenance object, including the algorithm (e.g., script) location/file directory, and the like.

In an embodiment, a user can input information about maintenance object into user interface 702D, including an algorithm for the maintenance object into user interface 704D, such that a maintenance object is generated within the enterprise framework. The enterprise framework can then store the metadata for the maintenance, for example, within the database itself and/or within the directory structure illustrated in FIG. 4.

Figure 7E:
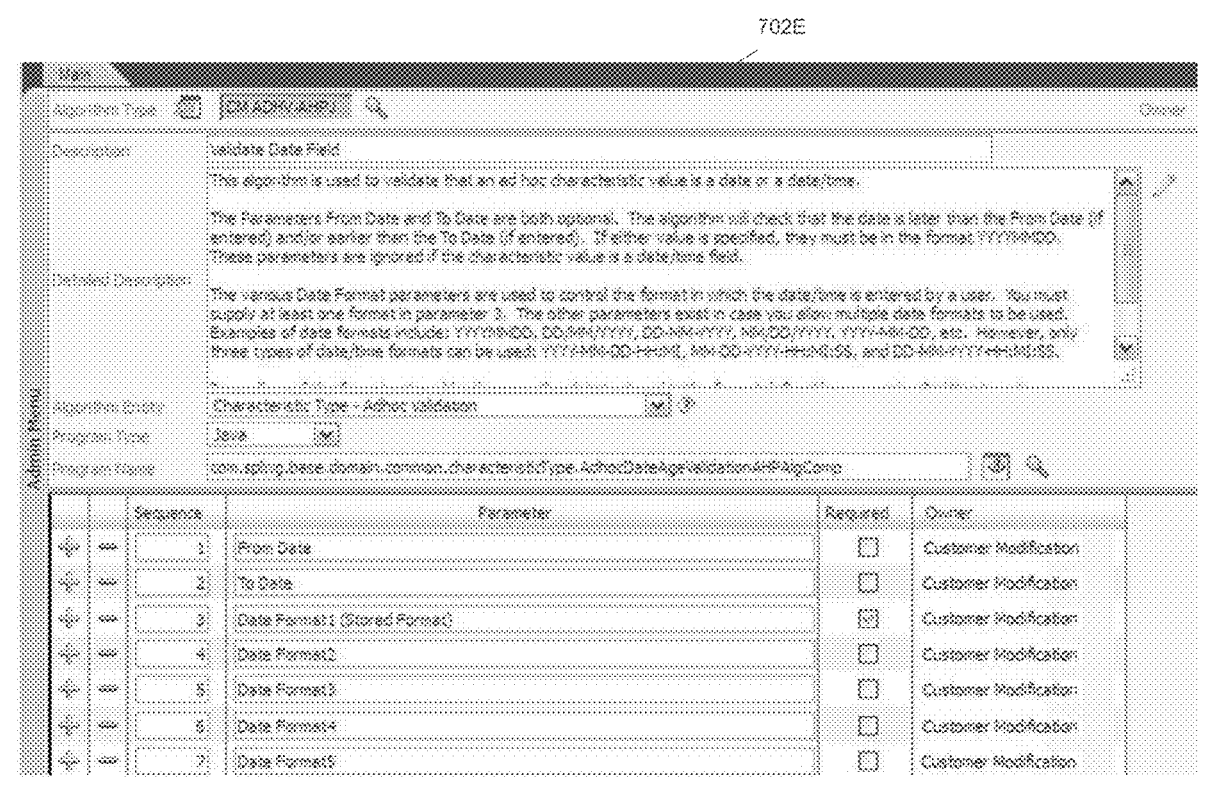

FIG. 7E displays a user interface for defining an algorithm for us within the enterprise framework. For example, user interface 702E includes user interface elements for defining an algorithm type, a description, an algorithm entity, a program type (e.g., Java, Cobol, and the like), a program name, and parameters and a sequence for the parameters that define a structure of the algorithm, and others. In an embodiment, a user can input information about an algorithm for use within the enterprise system into user interface 702E such that the algorithm is generated within the enterprise framework. The enterprise framework can then store the metadata for the algorithm, for example, within the database itself and/or within the directory structure illustrated in FIG. 4.

Embodiments include user interfaces that can be used to input other relevant metadata, for example to generate other enterprise elements within the enterprise framework. For example, a one or more user interfaces can be implemented for defining custom zone metadata for the enterprise framework such that a custom zone can be generated and implemented by the enterprise. The custom zone metadata can be similar to the metadata illustrated in FIG. 6C. In another example, a one or more user interfaces can be implemented for defining batch process metadata for the enterprise framework such that a batch process can be generated and implemented by the computing device.

In some embodiments, the enterprise framework manages the metadata for various components of the enterprise system, and the interrogation tool can be implemented in coordination with the enterprise framework to interrogate the enterprise computing devices. For example, the interrogation tool can be configured to retrieve database table information when interrogating a computing device. As discussed above, the database table can be generated within the enterprise framework by defining metadata for the database table, and the framework can then store this information (e.g., within a directory structure and/or the database itself). The interrogation tool can build SQL commands to query the metadata stored by the framework in order to retrieve the relevant database table information.

For example, an SQL command can be built that selects metadata that defines database tables. In embodiments where the metadata defines the actual enterprise database table (e.g., the enterprise database table is generated within the enterprise framework based on the defined metadata), the information that is returned by executing the SQL command can reflect the actual (e.g., implemented) enterprise database tables for the computing device. An example of built SQL that targets the metadata model and returns actual database tables follows:

In other words, in embodiments that implement the enterprise framework and the metadata model for defining/generating enterprise elements, building a query that targets the metadata stored by the enterprise framework effectively interrogates the enterprise level elements for the interrogated computing device. Embodiments of the built SQL commands are effective at interrogating the enterprise level elements implemented by a computing device at least because the conditions of the built SQL command are configured to return information in the presence of missing, incomplete, and/or differing amounts/types of defined metadata (e.g., defined by the enterprise framework).

For example, a database table, maintenance object, custom zone, batch process, or any other suitable enterprise element can be defined by a metadata model, however each piece of metadata in the model need not be defined for each database table, maintenance object, custom zone, batch process, and the like. In other words, a first enterprise database table and a second enterprise database table can have different metadata shapes based on their type, use in the enterprise system, and other factors. For example, these metadata shapes can be based on the metadata model for enterprise database tables, but the variations in type, use, and other factors for the tables can cause each table to have variations in the elements of metadata that define them. In some embodiments, the built SQL includes conditions that

```
select T1.table_name, T1.tablespace_name, T1.status, T1.pct_free,
T1.pct_used, T1.num_rows, T1.blocks, T1.partitioned, T1.compression,
T1.last_analyzed,
    NVL((SELECT max(t2.stale_stats) FROM ALL_TAB_STATISTICS T2 WHERE
T1.OWNER = T2.OWNER AND T1.TABLE_NAME = T2.TABLE_NAME and
OBJECT_TYPE = 'TABLE'),' ') STALE_STATS,
dbms_stats.get_prefs('STALE_PERCENT', T1.OWNER, T1.TABLE_NAME)
stale_percent, DBMS_STATS.GET_PREFS('METHOD_OPT',
T1.OWNER,T1.TABLE_NAME) method_opt, dbms_stats.get_prefs('INCREMENTAL',
T1.OWNER,T1.TABLE_NAME) use_incremental
    from all_tables T1
    WHERE EXISTS (SELECT 'X' FROM ALL_TABLES T3 WHERE T3.OWNER =
T1.OWNER and T3.TABLE_NAME = 'F1_INSTALLATION')
    order by table_name
```

In some embodiments, an SQL command can be built that selects metadata that defines implemented enterprise application customizations (e.g., custom zones). In embodiments where metadata defines actual custom zones implemented by an enterprise application (e.g., the custom zone is generated within the enterprise framework based on the defined metadata), the information that is returned by executing the SQL command can reflect the actual (e.g., implemented) custom zone for the computing device. An example of built SQL that targets the metadata model and returns actual custom zones follows:

```
SELECT A.ZONE_CD \"Zone\",
    B.DESCR \"Description\",
    A.ZONE_HDL_CD \"Zone Type\",
    C.DESCR \"Zone Type Description\"
FROM CI_ZONE A,
    CI_ZONE_L B,
    CI_ZONE_HDL_L C
WHERE A.OWNER_FLG = 'CM'
    AND A.ZONE_CD = B.ZONE_CD
    AND B.LANGUAGE_CD = (SELECT LANGUAGE_CD FROM
F1_INSTALLATION)
    AND A.ZONE_HDL_CD = C.ZONE_HDL_CD
    AND C.LANGUAGE_CD = B.LANGUAGE_CD
ORDER BY A.ZONE_CD;
``` account for these variations in defined metadata shape (e.g., the metadata elements that define each table) such that the returned information accurately reflects the implemented database tables of the computing device (e.g., even in the presence of variations in metadata shape).

Similarly, a first custom zone and a second custom zone can have different metadata shapes based on their type, use in the enterprise system, and other factors. For example, these metadata shapes can be based on the metadata model for custom zones, but the variations in type, use, and other factors for the custom zones can cause each to have variations in the elements of metadata that define them. In some embodiments, the built SQL includes conditions that account for these variations in defined metadata shape (e.g., the metadata elements that define each custom zone) such that the returned information accurately reflects the implemented custom zones of the computing device (e.g., even in the presence of variations in metadata shape).

In some embodiments, the conditions for a built SQL command for an enterprise element (e.g., database table, custom zone, and the like) can be tailored to the metadata model for the enterprise element. For example, built SQL commands can execute in a custom manner depending on the environment in which they are executed. In some embodiments, the built SQL commands can include logic that causes the commands to operate effectively in differing environments, thus achieving a robust interrogation tool. In such embodiments, certain pieces of metadata for an enterprise element can be considered primary because these elements are basic to the definition of metadata for the element. For example, a table name and a primary key may be primary pieces of metadata for a database table. Other pieces of metadata can be secondary for an enterprise element, such as a foreign key and other similar metadata in the database table example.

In some embodiments, a built SQL command can include conditions to select metadata based on one or more primary metadata pieces and also retrieve secondary metadata pieces. For example, the built SQL command can be configured to select rows given the primary metadata pieces, however can retrieve data fields that correspond to secondary metadata pieces if they are present (e.g., using OR conditions, WHERE EXISTS conditions, WHERE NOT EXISTS conditions, or other suitable logic). In other words, a built SQL command can use one or more primary metadata pieces to ensure that the retrieved metadata accurately reflects a comprehensive view of the enterprise elements being interrogated (e.g., returns are relevant enterprise database tables), while retrieving secondary metadata pieces to provide depth to the view of the retrieved metadata for the enterprise elements (e.g., provide a more detailed view of the enterprise data tables).

Embodiments of the built SQL commands also target enterprise elements in the presence of other elements, or non-enterprise elements (e.g., elements that are not managed by the enterprise framework, such as OUAF). For example, a database instance can include database elements that are managed by the framework (e.g., enterprise elements), as well as database elements that are not. Built SQL commands can exclude elements that are not managed by the framework by effectively targeting the metadata generated by the framework, and as such excluding other metadata that may represent other database elements.

For example, built SQL can target database indexes that pertain to the enterprise framework (e.g., OUAF product installed), even in the presence of other products which may be installed in the same database instance. The built SQL can achieve this by restricting retrieval based on a particular schema, such as the schema that hosts table F1_INSTALLATION, as illustrated by the below example:

```
select owner, index_name, index_type, table_name, uniqueness, compression,
status, num_rows from dba_indexes a
   where not exists (select 1
   from
      dba_hist_sql_plan p,
      dba_hist_sqlstat s,
   dba_hist_snapshot sn
   where
      p.object_owner < > 'SYS'
   and p.operation like '\%INDEX\%'
   and p.sql_id = s.sql_id
   and s.snap_id = sn.snap_id
   and p.object_name = a.index_name
   and sn.begin_interval_time between SYSDATE and SYSDATE - 365)
   and EXISTS (SELECT 'X' FROM ALL_TABLES T3 WHERE T3. OWNER =
A.OWNER and T3.TABLE NAME = 'F1_INSTALLATION')
   and SUBSTR(INDEX_NAME,1,2) NOT IN ('XT','XC','XMC','F1','FT','FC')
```

Embodiments build and execute a number of SQL commands to interrogate computing device and database processes. For example, built SQL commands can also retrieve batch process information for the interrogated computing device. In some embodiments, this extract logic can be controlled via the acceptance of input parameters to the interrogation tool (e.g., input to the script via command-line parameters) to generate differing output formats. For example, these differing output formats can be based on the transactional data present in the enterprise framework implemented by the computing device. The following represents example built SQL for retrieving batch process information.

```
if ($batch_format eq "NEW") {
   print $fh04 "SELECT \n";
   print $fh04 "BATCH_STATS.BATCH_CD, \n";
   print $fh04 "BATCH_STATS.SEP_1, \n";
   print $fh04 "BATCH_STATS.BATCH_BUS_DT_1, \n";
   print $fh04 "BATCH_STATS.RUN_STATUS_1, \n";
   print $fh04 "BATCH_STATS.THREADS_1, \n";
   print $fh04 "BATCH_STATS.REC_PRCSD_1, \n";
   print $fh04 "BATCH_STATS.RUN_TIME_1, \n";
   print $fh04
"to_char((TO_NUMber(BATCH_STATS.REC_PRCSD_1,'999,999,999')/
TO_NUMber(BATCH_STATS.RUN_TIME_1,'999,999,999.99')),'999,999.9999') RPS_1,
\n";
   print $fh04 "BATCH_STATS.SEP_2, \n";
   print $fh04 "BATCH_STATS.BATCH_BUS DT_2, \n";
```

```
    print $fh04 "BATCH_STATS.RUN_STATUS_2, \n";
    print $fh04 "BATCH_STATS.THREADS-2, \n";
    print $fh04 "BATCH_STATS.REC_PRCSD_2, \n";
    print $fh04 "BATCH_STATS.RUN TIME 2, \n";
    print $fh04
"to_char((TO_NUMber(BATCH_STATS.REC_PRCSD_2,'999,999,999')/
TO_NUMber(BATCH STATS.RUN_TIME_2,'999,999,999.99')),'999,999.9999') RPS_2,
\n";
    print $fh04 "BATCH_STATS.SEP_3, \n";
    print $fh04 "BATCH_STATS.BATCH_BUS_DT_3, \n";
    print $fh04 "BATCH_STATS.RUN_STATUS_3, \n";
    print $fh04 "BATCH_STATS.THREADS_3, \n";
    print $fh04 "BATCH_STATS.REC_PRCSD_3, \n";
    print $fh04 "BATCH_STATS.RUN_TIME_3, \n";
    print $fh04
"to_char((TO_NUMber(BATCH_STATS.REC_PRCSD_3,'999,999,999')/
TO_NUMber(BATCH STATS.RUN_TIME_3,'999,999,999.99')),'999,999.9999') RPS_3
\n";
    print $fh04 "FROM \n";
    print $fh04 "(SELECT CI_BATCH_CTRL.BATCH_CD \n";
    print $fh04 ",'* 'SEP_1 \n";
    print $fh04",TO_CHAR(RUN_1.BATCH_BUS_DT, 'yyyy-mm-dd')
BATCH_BUS_DT_1 \n";
    print $fh04 ",(SELECT DESCR FROM CI_LOOKUP_VAL_L_WHERE
LANGUAGE_CD = 'ENG' AND FIELD_NAME = 'RUN_STATUS' AND_FIELD_VALUE =
RUN_1.RUN_STATUS) RUN_STATUS 1 \n";
    print $fh04" ,NVL((SELECT
TO_CHAR(max(b.batch_thread_nbr),'999,999,999') from ci_batch_inst b WHERE
b.batch_cd = RUN_1.batch_cd AND b.batch_nbr =
RUN_1.batch_nbr),TO_CHAR(0,'999,999,999')) THREADS_1 \n";
    print $fh04" ,NVL((SELECT
TO_CHAR(sum(b.rec_proc_cnt),'999,999,999') from ci_batch_inst b WHERE
b.batch cd = RUN_1.batch_cd AND b.batch_nbr =
RUN_1.batch nbr),TO_CHAR(0,'999,999,999')) REC_PRCSD_1 \n";
    print $fh04 " ,NVL((SELECT
TO_CHAR((((to_date(max(e.message_parm), 'yyyy-mm-dd-hh24.mi.ss') -
to_date(min(d.message_parm), 'yyyy-mm-dd-hh24.mi.ss')) * 24 * 60 * 60) + 1),
'999,999,999.99') \n";
    print $fh04 " from ci_batch_inst b \n";
    print $fh04 " JOIN ci_msg_log d1 ON d1.scheduler_id =
b.scheduler_id_AND d1.message_nbr in ('11913','90001','90002') \n";
    print $fh04 " JOIN ci_msg_logparm d ON d.scheduler_id =
b.svvcheduler_id AND d.message_seq = d1.message_seq AND d.message_parm LIKE
'2__-__-__-__.__.__'\n";
    print $fh04 " JOIN ci_msg_log e1 ON e1.scheduler_id =
b.scheduler_id AND e1.message_nbr in ('12114','12115','90003','90004') \n";
    print $fh04 " JOIN ci_msg_logparm e ON e.scheduler_id =
b.scheduler_id AND e.message_seq = e1 .message_seq AND e.message_parm LIKE
'2__-__-__-__.__.__'\n";
    print $fh04 " WHERE b.batch_cd = RUN_1.batch_cd AND
b.batch_nbr = RUN_1.batch nbr),to_char(1,'999,999,999.99')) RUN_TIME 1 \n ";
    print $fh04 ",' * ' SEP_2 \n";
    print $fh04 " ,TO_CHAR(RUN_2.BATCH_BUS_DT, 'yyyy-mm-dd')
BATCH_BUS_DT_2 \n";
    print $fh04 " ,(SELECT DESCR FROM CI_LOOKUP_VAL_L WHERE
LANGUAGE_CD = 'ENG' AND FIELD_NAME = 'RUN_STATUS' AND FIELD_VALUE =
RUN_2.RUN_STATUS) RUN_STATUS_2 \n";
    print $fh04 " ,NVL((SELECT
TO_CHAR(max(b.batch_thread_nbr),'999,999,999') from ci_batch_inst b WHERE
b.batch_cd = RUN_2.batch_cd AND b.batch_nbr =
RUN_2.batch_nbr),TO_CHAR(0,'999,999,999')) THREADS_2 \n";
    print $fh04 " ,NVL((SELECT
TO_CHAR(sum(b.rec_proc_cnt),'999,999,999') from ci_batch_inst b WHERE
b.batch cd = RUN_2.batch_cd AND b.batch_nbr =
RUN_2.batch_nbr),TO_CHAR(0,'999,999,999')) REC_PRCSD_2 \n";
    print $fh04 " ,NVL((SELECT
TO_CHAR((((to_date(max(e.message parm), yyyy-mm-dd-hh24.mi.ss') -
to_date(min(d.message_parm), 'yyyy-mm-dd-hh24.mi.ss')) *24 *60 * 60) + 1),
'999,999,999.99') \n";
    print $fh04 " from ci_batch_instb \n";
    print $fh04 " JOIN ci_msg_log d1 ON d1.scheduler_id =
b.scheduler_id AND d1.message_nbr in ('11913','90001','90002') \n";
    print $fh04 " JOIN ci_msg_logparm d ON d.scheduler_id =
b.scheduler_id AND d.message_seq = d1.message_seq AND d.message_parm LIKE
'2__-__-__-__.__.__'\n";
    print $fh04 " JOIN ci_msg_log e1 ON e1.scheduler_id =
```

-continued

```
b.scheduler_id AND e1.message_nbr in ('12114','12115','90003','90004') \n ";
    print $fh04 " JOIN ci_msg_logparm e ON e.scheduler_id =
b.scheduler_id AND e.message_seq = e1.message_seq AND e.message_parm LIKE
'2__-__-__-__.__.__'\n";
    print $fh04 " WHERE b.batch_cd = RUN_2.batch_cd AND
b.batch_nbr = RUN_2.batch_nbr),to_char(1,'999,999,999.99')) RUN_TIME_2 \n ";
    print $fh04 "," * ' SEP_3\n";
    print $fh04 " ,TO_CHAR(RUN_3.BATCH_BUS_DT, 'yyyy-mm-dd')
BATCH_BUS_DT_3 \n ";
    print $fh04 " ,(SELECT DESCR FROM CI_LOOKUP_VAL_L WHERE
LANGUAGE_CD = 'ENG' AND FIELD_NAME = 'RUN_STATUS' AND FIELD_VALUE =
RUN_3.RUN_STATUS) RUN_STATUS_3 \n ";
    print $fh04 " ,NVL((SELECT
TO_CHAR(max(b.batch_thread_nbr),'999,999,999') from ci_batch_inst b WHERE
b.batch_cd = RUN_3.batch_cd AND b.batch_nbr =
RUN_3.batch_nbr),TO_CHAR(0,'999,999,999')) THREADS_3 \n";
    print $fh04 ",NVL((SELECT
TO_CHAR(sum(b.rec_proc_cnt),'999,999,999') from ci_batch_inst b WHERE
b.batch_cd = RUN_3.batch_cd AND b.batch_nbr =
RUN_3.batch_nbr),TO_CHAR(0,'999,999,999')) REC_PRCSD_3 \n ";
    print $fh04" ,NVL((SELECT
TO_CHAR((((to_date(max(e.message_parm), 'yyyy-mm-dd-hh24.mi.ss') -
to_date(min(d.message_parm), 'yyyy-mm-dd-hh24.mi.ss')) * 24 * 60 * 60) +1),
'999,999,999.99') \n ";
    print $fh04 " from ci_batch_inst b \n";
    print $fh04" JOIN ci_msg_log d1 ON d1.scheduler_id =
b.scheduler_id AND d1 .message_nbr in ('11913','90001','90002') \n ";
    print $fh04" JOIN ci_msg_logparm d ON d.scheduler_id =
b.scheduler_id AND d.message_seq = d1 .message_seq AND d.message_parm LIKE
'2__-__-__-__.__.__'\n";
    print $fh04" JOIN ci_msg_log e1 ON e1.scheduler_id =
b.scheduler_id AND e1.message_nbr in ('12114','12115','90003','90004') \n ";
    print $fh04" JOIN ci_msg_logparm e ON e.scheduler_id =
b.scheduler_id AND e.message_seq = e1 .message_seq AND e.message_parm LIKE
'2__-__-__-__.__.__'\n";
    print $fh04" WHERE b.batch_cd = RUN_1.batch_cd AND
b.batch_nbr = RUN_1.batch_nbr),to_char(1,'999,999,999.99')) RUN_TIME_3 \n";
    print $fh04" FROM CI_BATCH_CTRL \n";
    print $fh04 " left outer join ci_batch_run RUN_1 on
RUN_1.BATCH_CD = CI_BATCH_CTRL.BATCH_CD and RUN_1.batch_nbr =
CI_BATCH_CTRL.next_batch_nbr - 1 \n";
    print $fh04 " left outer join ci_batch_run RUN_2 on
RUN_2.BATCH_CD = CI_BATCH_CTRL.BATCH_CD and RUN_2.batch_nbr =
CI_BATCH_CTRL.next_batch_nbr -2 \n";
    print $fh04 "left outer join ci_batch_run RUN_3 on
RUN_3.BATCH_CD = CI_BATCH_CTRL.BATCH_CD and RUN_3.batch_nbr =
CI_BATCH_CTRL.next_batch_nbr - 3 \n";
    print $fh04" WHERE
ci_batch_ctrl.LAST_UPDATE_DTTM > SYSDATE - 200 \n";
    print $fh04" AND ci_batch_ctrl.batch_cd NOT LIKE
'CIPV%'\n";
    print $fh04" AND ci_batch_ctrl.batch_cd NOT LIKE 'VAL-
%') BATCH_STATS \n";
    print $fh04 " order by batch_cd; \n";
    print $fh04 "\n";
    }
    else {
    print $fh04 "SELECT ctrl.batch_cd, \n";
    print $fh04 " ctrl.program_name, \n";
    print $fh04 " ctrl.next_batch_nbr, \n";
    print $fh04 " NVL(( \n";
    print $fh04 " SELECT max(batch_thread_nbr) \n";
    print $fh04 " FROM ci_batch_thd thd \n";
    print $fh04 " WHERE thd.batch_cd =
ctrl.batch_cd \n";
    print $fh04 " ), 1) max_threads, \n";
    print $fh04 " to_char(ctrl.last_update_dttm, 'yyyy-mm-dd')
last_run \n";
    print $fh04 " FROM ci_batch_ctrl ctrl \n";
    print $fh04 " JOIN ci_batch_run job on job.batch_cd = ctrl.batch_cd \n";
    print $fh04 " WHERE trunc(job.batch_bus_dt) > SYSDATE - 200 \n";
    print $fh04 " AND ctrl.batch_cd NOT LIKE 'CIPV%'\n";
    print $fh04 "AND ctrl.batch_cd NOT LIKE 'VAL-%'\n";
    print $fh04 "and job.batch_nbr = (select max(batch_nbr) from
ci_batch_run cbjm where cbjm.batch_cd = ctrl.batch_cd) \n";
    print $fh.04 " ORDER BY BATCH_CD ASC; \n";
    print $fh.04 "\n";
}
```

Embodiments also include built SQL commands that retrieve incomplete sync information. For example, incomplete sync information can represent incomplete synchronization requests between local/session/cache data and back end data (e.g., the database). The following represents example built SQL for retrieving incomplete sync information.

```
print $fh3 " SELECT rec_type,\n";
print $fh3 " bus_obj_cd,\n";
print $fh3 " maint_obj_cd,\n";
print $fh3 " TRUNC(CRE_DTTM),\n";
print $fh3 " bo_status_cd,\n";
print $fh3 " COUNT(*) \n";
print $fh3 " FROM\n";
print $fh3 " (SELECT 'SYNC IN' Rec_Type,\n";
print $fh3 " a.BUS_OBJ_CD,\n";
print $fh3 " a.MAINT_OBJ_CD,\n";
print $fh3 " a.CRE_DTTM, \n";
print $fh3 " a. BO_STATUS_CD\n";
print $fh3 " FROM f1_sync_req_in a, \n";
print $fh3 " f1_bus_obj b\n";
print $fh3 " WHERE a.BUS_OBJ_CD != '%Ongoing%'\n";
print $fh3 " AND a.bus_obJ_cd = b.bus_obj_cd\n";
print $fh3 " AND (a.bo_status_cd = 'ERROR'\n";
print $fh3 " OR EXISTS\n";
print $fh3 " (SELECT 'x'\n";
print $fh3 " FROM f1_bus_obj_status c\n";
print $fh3 " WHERE c.bus_obj_cd = b.life_cycle_bo_cd\n";
print $fh3 " c.bo_status_cd = a.bo_status_cd\n";
print $fh3 " AND c.bo_status_cond_fig 1 != 'F1FL'\n";
print $fh3 " ))\n";
print $fh3 " AND EXISTS\n";
print $fh3 " (SELECT 'x'\n";
print $fh3 " FROM f1_sync_req_in_excp b\n";
print $fh3 " WHERE b.f1_sync_req_in_id = a.f1_sync_req_in_id\n";
print $fh3 " )\n";
print $fh3 " AND TRUNC(A.CRE_DTTM) < TRUNC(SYSDATE)\n";
print $fh3 " UNION\n";
print $fh3 " SELECT 'SYNC OUT' Rec_Type,\n";
print $fh3 " a.BUS_OBJ_CD,\n";
print $fh3 " a.maint_obj_cd,\n";
print $fh3 " a.CRE_DTTM,\n";
print $fh3 " a.BO_STATUS_CD\n";
print $fh3 " FROM f1_sync_req a,\n";
print $fh3 " f1_bus_obj b\n";
print $fh3 " WHERE a.BUS_OBJ_CD != '%Ongoing%'\n";
print $fh3 " AND a.bus_obJ_cd = b.bus_obj_cd\n";
print $fh3 " AND (a.bo_status_cd = 'ERROR'\n";
print $fh3 " OR EXISTS\n";
print $fh3 " (SELECT 'x'\n";
print $fh3 " FROM f1_bus_obj_status c\n";
print $fh3 " WHERE c.bus_obj_cd = b.life_cycle_bo_cd\n";
print $fh3 " AND c.bo_status_cd = a.bo_status_cd\n";
print $fh3 " AND c.bo_status_cond_fig ! = 'F1FL'\n";
print $fh3 " ))\n";
print $fh3 " AND TRUNC(A.CRE_DTTM) < TRUNC(SYSDATE)\n";
```

Figure 8:
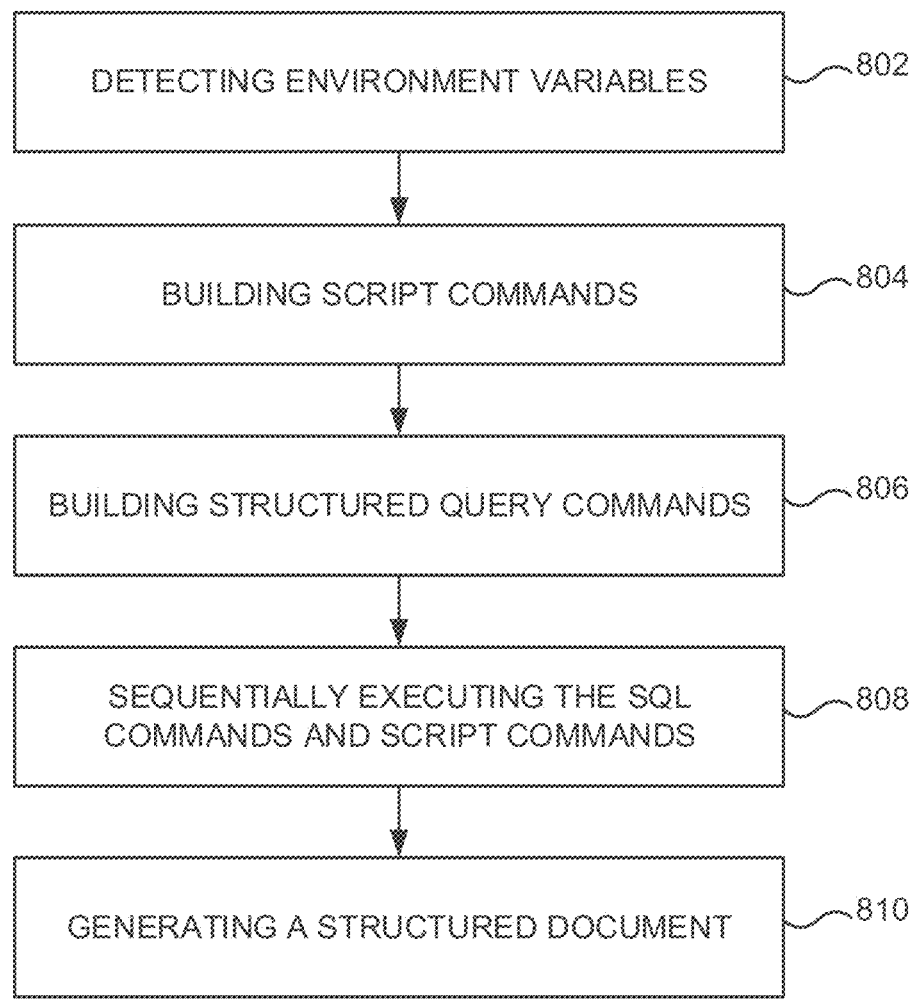
FIG. 8 illustrates a flowchart for interrogating heterogenous computing systems using a tool according to an example embodiment.

FIG. 8 illustrates a flowchart for interrogating heterogenous computing systems using a tool according to an example embodiment. In some embodiments, the functionality of FIG. 8 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIG. 8 can be performed by one or more elements of system 200 of FIG. 2.

At 802, environment variables of a computing device can be detected, the environment variables including at least an operating system for the computing device. In some embodiments, other environmental variables that can be detected include versions of running software (e.g., Java, Cobol, Perl, and the like), the presence of a database, and other suitable environmental variables.

At 804, script commands configured using one or more of the retrieved environment variables can be built, where the built script commands are customized based on the detected operating system. For example, a script command specific to the detected operating system can be built to retrieve disk space utilization. In another example, a script command specific to the detected operating system can be built to detect kernel settings.

At 806, SQL commands configured to retrieve metadata about enterprise elements associated with the computing device can be built. For example, the SQL commands can be built according to the metadata model for enterprise elements associated with the interrogated computing device. These enterprise elements can include database tables, maintenance objects, custom zones, and other suitable elements.

At 808, the SQL commands and script commands can be sequentially executed on the computing device, where the execution of the SQL commands and script commands is customized to the computing device such that device specific database execution parameters and application execution parameters are returned.

In an embodiment, the device specific database execution parameters include cache execution parameters that define data tables that are cached by the computing device. For example, the cache execution parameters can include a number of rows for each database that are cached by the computing device.

In an embodiment, the application execution parameters include batch processes that have been executed on the computing device within a period of time and batch processes that have not been executed on the computing device within the period of time. In an embodiment, the application execution parameters include incomplete synchronization requests, a timestamp for the incomplete synchronization requests, and a count for a number of attempts for the incomplete synchronization requests. In an embodiment, the application execution parameters include custom zones that have been generated for enterprise applications associated with the computing device. For example, the custom zones can be user interface elements configured to retrieve and display enterprise data.

At, 810 a structured language document organized according to the returned database execution parameters and application execution parameters can be generated. The structured language document can be an HTML document in some examples.

In an embodiment, the building of the structured query level commands, the building of the script commands, and the sequential execution of the SQL commands and script commands are performed by an interrogation script. For example, the interrogation script can include logic such that custom script commands are built for different detected operating systems. In an embodiment, the interrogation script can be a Perl script.

In some embodiments, the interrogation script can be executed on a plurality of enterprise computing devices, and a plurality of custom structured language documents can be generated (e.g., for each computing device). For example, execution of the interrogation script on each computing device can include: building script commands configured using one or more of the retrieved environment variables for each computing device, where the built script commands are customized based on the detected operating system for each computing device; building SQL commands configured to retrieve metadata about enterprise elements associated with each computing device; and sequentially executing the SQL commands and script commands on each computing device, wherein the execution of the SQL commands and script commands is customized to each computing device such that device specific database execution parameters and application execution parameters are returned for each computing device.

Embodiments interrogate heterogenous computing systems using a tool. In some embodiments, an enterprise system can be implemented by a number of different computing systems, each with its own configuration. For example, a first computing device (or cluster of computing devices) may run a first operating system ("OS"), implement a database with a number of tables, include a mix of applications and customizations, run a first schedule of batch processes, and include any other suitable set of configurations for an enterprise system. A second computing device (or cluster of computing devices) may not implement a database, may run a second operating system ("OS"), include a different mix of applications and customizations, run a second schedule of batch processes, and include any other suitable set of configurations for an enterprise system.

Embodiments interrogate these computing devices with a robust tool that is configured to return computing device specific information, such as database execution parameters, application execution parameters, and the like. For example, the robust tool can detect environmental conditions for each of the computing devices. The tool can then build structured query language ("SQL") commands and script commands (e.g., OS specific script commands) designed to interrogate a computing device.

Embodiments can then execute the built SQL commands and script commands. For example, the SQL commands and script commands can achieve a computing device specific custom level of execution and return execution information about how the computing device implements various enterprise elements.

In some embodiments, information returned from the executed SQL and script commands can include a number of database tables, rows for each table, and a cache status for database tables. In another example, the returned information can include the batch processes that have been executed within a period of time on the computing device. In yet another example, the returned information can include database lookups that have been run on the computing device with a number of values above a threshold. In yet another example, the returned information can include patches, fixes, and/or updates installed on the computing device.

In some embodiments, the tool can execute based on an enterprise framework that is implemented on the computing devices. For example, the enterprise framework can include software and workflows for layering enterprise functionality onto heterogeneous computing devices. In some embodiments, the framework can include user interface components, data management components, and other related functionality for implementing and storing configuration information/metadata about a computing environment. For example, a user can navigate user interfaces and input corresponding information to generate an enterprise database table (e.g., in the context of an enterprise system). Metadata for the database table can then be stored by the framework, for example according to a storage policy. Embodiments of the interrogation tool can generate a query command (e.g., SQL query) for querying this stored metadata. Depending on how the framework and user have populated the metadata for database tables, the executed SQL will return information pertinent to the computing device being interrogated.

In this example, the pertinent information can include a total number of database tables, a cache status, row information, attribute information, foreign key information, and the like. For instance, when creating the database table using the framework elements, the user may input certain aspects of metadata and may not input other aspects (e.g., may leave non-mandatory fields within the user interface blank or certain fields may not apply to some data tables). Accordingly, the metadata will not be populated for fields that have been left blank or that do not apply. Embodiments of the interrogation tool build SQL statements based on the metadata model for enterprise elements.

In another example, a user can navigate user interfaces and input corresponding information to generate a batch script (e.g., in the context of an enterprise system). Similarly, metadata for the batch script can then be stored by the framework, for example according to a storage convention. Embodiments of the interrogation tool can then generate a query command (e.g., SQL query) for querying this stored metadata. Depending on how the framework and user have populated the metadata for batch scripts, the executed SQL will return information pertinent to the computing device being interrogated.

In some embodiments, information returned by executing the SQL and script commands can indicate an error status or inefficient resource usage for the interrogated computing device. For example, a lack of batch processes can indicate that certain memory usage/garbage collection batch processes are not being effectively implemented. In another example, the cache status for data tables can indicate inefficient cache usage. In yet another example, database look ups with a number of return values above a threshold can indicate poor processor utilization. In yet another example, the returned patches, fixes, and/or updates can be compared to expected patches, fixes, and/or updates to detect out of date implementations and security vulnerabilities.

Conventional approaches to such computing device interrogation involved manual query and command execution by a skilled user. For example, the skilled user would have to be knowledgeable about a variety of different operating systems, different database implementations, SQL commands specific to a number of different enterprise metadata models, script commands specific to a number of different environmental conditions, and the like. In addition, this skilled user would commonly need to manually interrogate a number of different computing devices, using different commands, in order to understand how an enterprise system is implemented. Such a manual process is both costly and time consuming. Embodiments solve these challenges by providing a robust tool that can automatically interrogate computing devices with a variety of different environmental conditions.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

I claim:

1. A method for interrogating a heterogeneous computing system using a tool, the method comprising:
   detecting environment variables of a computing device, the environment variables including at least an operating system for the computing device;
   building, by an interrogation script, script commands configured using one or more of the retrieved environment variables, wherein the built script commands are customized based on the detected operating system;
   building, by an interrogation script, structured query level commands configured to retrieve metadata about enterprise elements associated with the computing device;
   sequentially executing, by an interrogation script, the SQL commands and script commands on the computing device, wherein the execution of the SQL commands and script commands is customized to the computing device such that device specific database execution parameters and application execution parameters are returned, wherein the application execution parameters comprise incomplete synchronization requests and a timestamp for the incomplete synchronization requests; and
   generating a structured language document organized according to the returned database execution parameters and application execution parameters.

2. The method of claim 1, wherein the interrogation script comprises logic such that custom script commands are built for different detected operating systems.

3. The method of claim 2, wherein the device specific database execution parameters comprise cache execution parameters that define data tables that are cached by the computing device.

4. The method of claim 3, wherein the cache execution parameters comprise a number of rows for each database that are cached by the computing device.

5. The method of claim 1, wherein the application execution parameters comprise batch processes that have been executed on the computing device within a period of time and batch processes that have not been executed on the computing device within the period of time.

6. The method of claim 1, wherein the application execution parameters comprise a count for a number of attempts for the incomplete synchronization request.

7. The method of claim 1, wherein the application execution parameters comprise custom zones that have been generated for enterprise applications associated with the computing device.

8. The method of claim 7, wherein the custom zones comprise user interface elements configured to retrieve and display enterprise data.

9. The method of claim 1, further comprising:
   executing the interrogation script on a plurality of enterprise computing devices and generating a plurality of custom structured language documents, wherein the execution of the interrogation script on each of the computing devices comprises:
   building script commands configured using one or more of the retrieved environment variables for each computing device, wherein the built script commands are customized based on the detected operating system for each computing device;
   building SQL commands configured to retrieve metadata about enterprise elements associated with each computing device; and
   sequentially executing the SQL commands and script commands on each computing device, wherein the execution of the SQL commands and script commands is customized to each computing device such that device specific database execution parameters and application execution parameters are returned for each computing device.

10. A system for interrogating a heterogeneous computing system using a tool, the system comprising:
    a processor; and
    a memory storing instructions for execution by the processor, the instructions configuring the processor to:
    detect environment variables of a computing device, the environment variables including at least an operating system for the computing device;
    build, by an interrogation script, script commands configured using one or more of the retrieved environment variables, wherein the built script commands are customized based on the detected operating system;
    build, by an interrogation script, structured query level commands configured to retrieve metadata about enterprise elements associated with the computing device;
    sequentially execute, by an interrogation script, the SQL commands and script commands on the computing device, wherein the execution of the SQL commands and script commands is customized to the computing device such that device specific database execution parameters and application execution parameters are returned, the execution parameters comprising incomplete synchronization requests and a timestamp for the incomplete synchronization requests; and
    generate a structured language document organized according to the returned database execution parameters and application execution parameters.

11. The system of claim 10, wherein the interrogation script comprises logic such that custom script commands are built for different detected operating systems.

12. The system of claim 11, wherein the device specific database execution parameters comprise cache execution parameters that define data tables that are cached by the computing device.

13. The system of claim 10, wherein the application execution parameters comprise batch processes that have been executed on the computing device within a period of time and batch processes that have not been executed on the computing device within the period of time.

14. The system of claim 10, wherein the application execution parameters comprise a count for a number of attempts for the incomplete synchronization request.

15. The system of claim 10, wherein the application execution parameters comprise custom zones that have been generated for enterprise applications associated with the computing device.

16. The system of claim 15, wherein the custom zones comprise user interface elements configured to retrieve and display enterprise data.

17. The system of claim 15, wherein the instructions configure the processor to:

execute the interrogation script on a plurality of enterprise computing devices and generating a plurality of custom structured language documents, wherein the execution of the interrogation script on each of the computing devices comprises:

building commands configured using one or more of the retrieved environment variables for each computing device, wherein the built script commands are customized based on the detected operating system for each computing device;

building SQL commands configured to retrieve metadata about enterprise elements associated with each computing device; and sequentially executing the SQL commands and script commands on each computing device, wherein the execution of the SQL commands and script commands is customized to each computing device such that device specific database execution parameters and application execution parameters are returned for each computing device.

18. A non-transitory computer readable medium having instructions stored thereon that, when executed by a processor, cause the processor to interrogate a heterogeneous computing system, wherein, when executed, the instructions cause the processor to:

a processor; and a memory storing instructions for execution by the processor, the instructions configuring the processor to:

detect environment variables of a computing device, the environment variables including at least an operating system for the computing device;

build, by an interrogation script, script commands configured using one or more of the retrieved environment variables, wherein the built script commands are customized based on the detected operating system;

build, by an interrogation script, structured query level commands configured to retrieve metadata about enterprise elements associated with the computing device;

sequentially, by an interrogation script, execute the SQL commands and script commands on the computing device, wherein the execution of the SQL commands and script commands is customized to the computing device such that device specific database execution parameters and application execution parameters are returned, the execution parameters comprising incomplete synchronization requests and a timestamp for the incomplete synchronization requests; and generate a structured language document organized according to the returned database execution parameters and application execution parameters.

* * * * *